(12) United States Patent
Shimamura

(10) Patent No.: US 10,297,983 B2
(45) Date of Patent: May 21, 2019

(54) METHOD OF MANUFACTURING SPARK PLUG

(71) Applicant: NGK SPARK PLUG CO., LTD., Nagoya-shi, Aichi (JP)

(72) Inventor: Takuya Shimamura, Iwakura (JP)

(73) Assignee: NGK SPARK PLUG CO., LTD., Nagoya-shi (JP)

( * ) Notice: Subject to any disclaimer, the term of this patent is extended or adjusted under 35 U.S.C. 154(b) by 0 days.

(21) Appl. No.: 15/926,358

(22) Filed: Mar. 20, 2018

(65) Prior Publication Data

US 2018/0301878 A1    Oct. 18, 2018

(30) Foreign Application Priority Data

Mar. 21, 2017 (JP) .................. 2017-054839

(51) Int. Cl.
| | | |
|---|---|---|
| *H01T 21/02* | (2006.01) | |
| *G05B 19/4097* | (2006.01) | |
| *H01T 13/20* | (2006.01) | |
| *H01T 13/58* | (2011.01) | |

(52) U.S. Cl.
CPC ......... *H01T 21/02* (2013.01); *G05B 19/4097* (2013.01); *H01T 13/20* (2013.01); *H01T 13/58* (2013.01); *G05B 2219/35134* (2013.01)

(58) Field of Classification Search
CPC ......... H01T 21/02; H01T 21/00; H01T 21/06; H01T 13/20; H01T 13/58; H01T 13/26; H01T 13/60; G05B 19/4097; G05B 2219/35134; H01J 9/42; B24C 1/04; F02P 17/12
See application file for complete search history.

(56) References Cited

U.S. PATENT DOCUMENTS

| | | | |
|---|---|---|---|
| 2017/0141546 A1* | 5/2017 | Fujii | ............... H01T 13/20 |
| 2018/0331508 A1* | 11/2018 | Hwang | ............... H01T 13/32 |
| 2018/0375299 A1* | 12/2018 | Yamada | ............... H01T 13/38 |

FOREIGN PATENT DOCUMENTS

| | | |
|---|---|---|
| JP | 2004-214218 A | 7/2004 |
| JP | 2008-302428 A | 12/2008 |

OTHER PUBLICATIONS

Office Action received in corresponding Japanese Patent Application No. 2017-054839, dated Jan. 29, 2019.

* cited by examiner

*Primary Examiner* — Joseph L Williams
*Assistant Examiner* — Jose M Diaz
(74) *Attorney, Agent, or Firm* — Kusner & Jaffe

(57) ABSTRACT

A spark plug has an electrode including a base portion and a tip joined to a specific surface that is a specific outer surface of the base portion, the tip forming a spark discharge surface. Respective relative positions of a plurality of points on an outer surface of a target portion of the electrode including the base portion and the tip joined to the base portion, which is a portion including at least a portion of the specific surface of the base portion and the tip, are identified to generate three-dimensional coordinate data representing the three-dimensional shape of the target portion. The coordinate data is analyzed to determine whether the target portion of the electrode includes a predetermined unintentional portion that is an unintended portion. An electrode including the unintentional portion is excluded from objects to be manufactured, and an electrode not including the unintentional portion is used to assemble the spark plug.

5 Claims, 11 Drawing Sheets

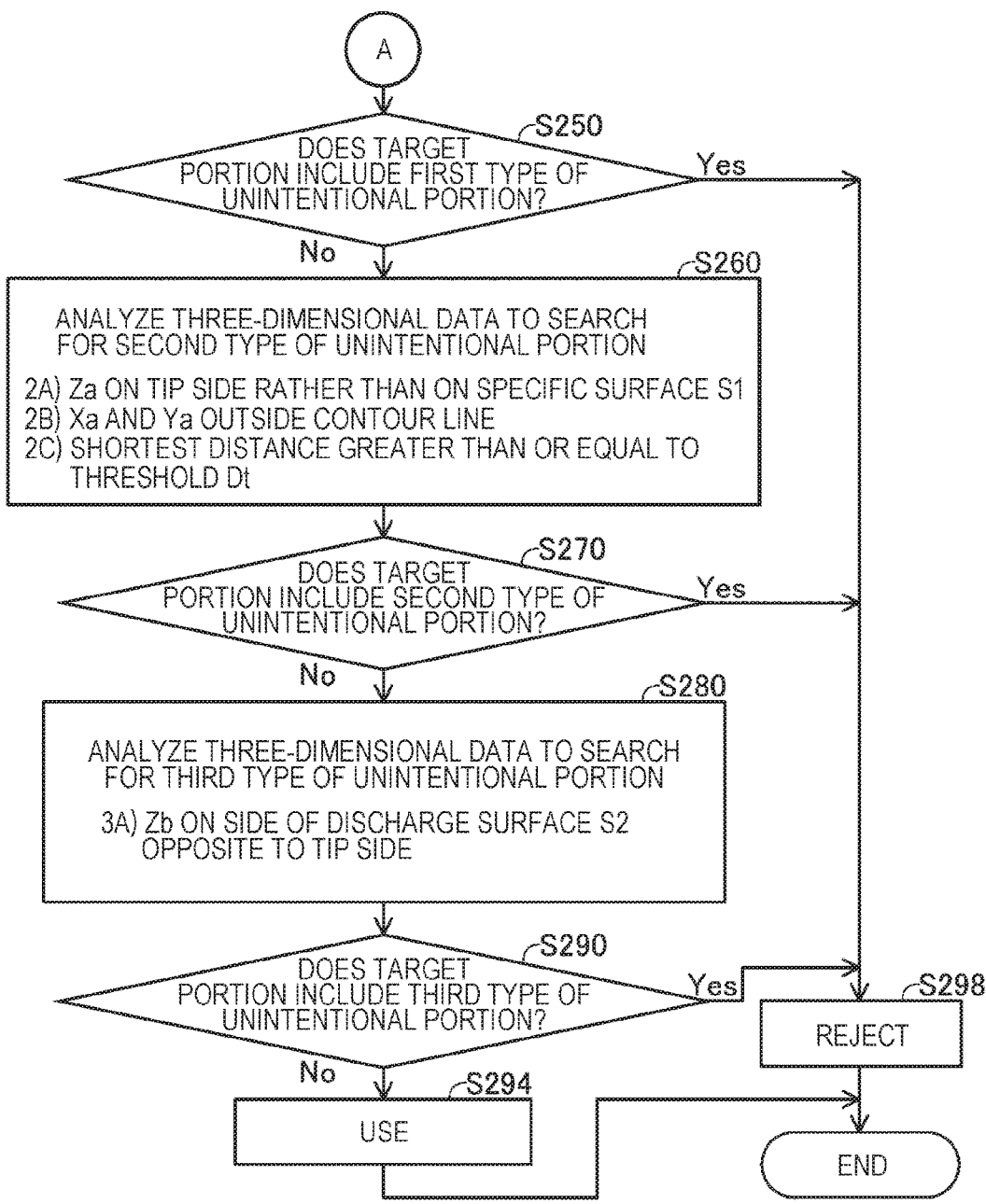

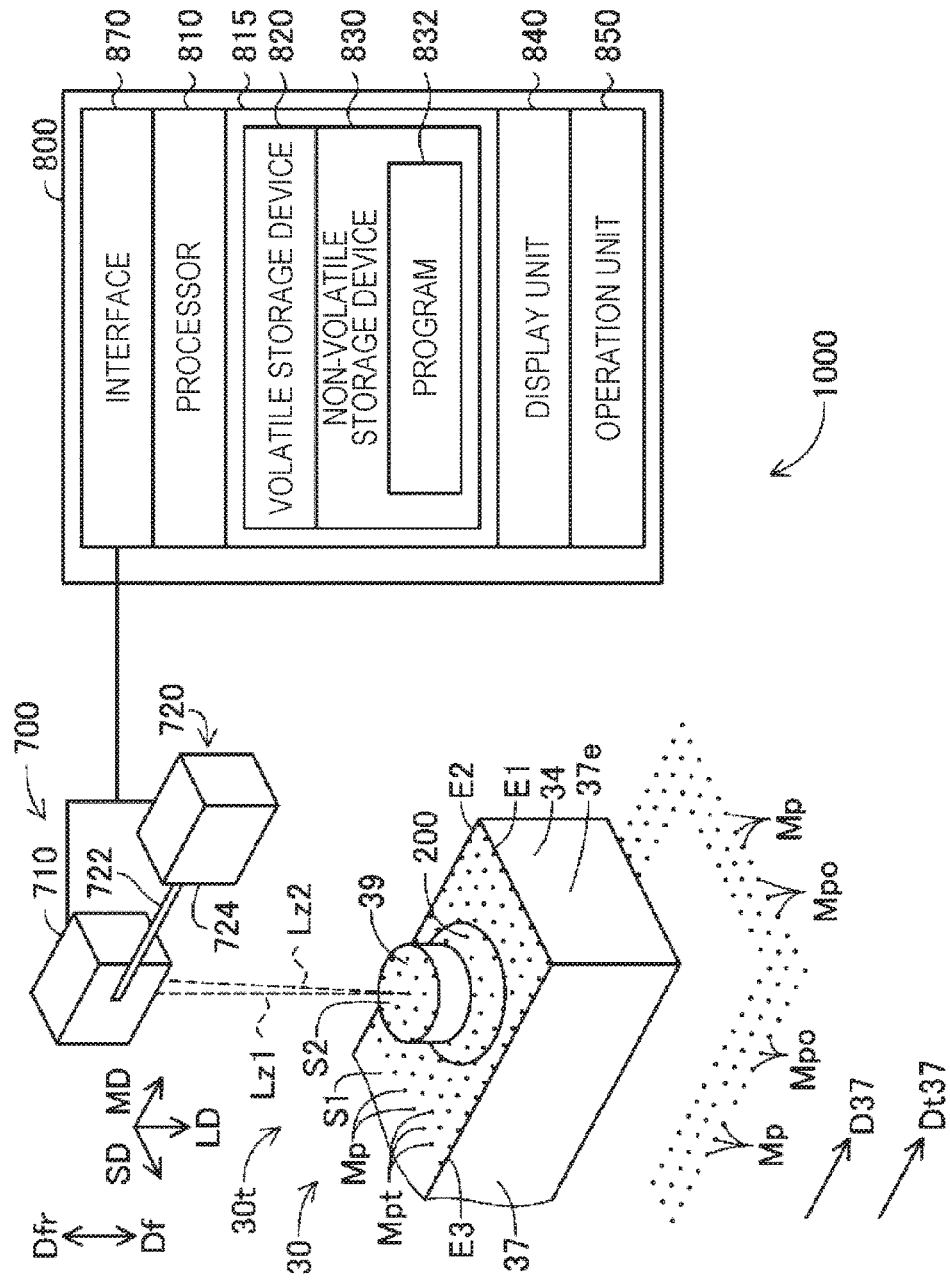

METHOD OF MANUFACTURING SPARK PLUG

CROSS-REFERENCE TO RELATED APPLICATION

This application claims priority from Japanese Patent Application No. 2017-054839 filed on Mar. 21, 2017, the entire subject-matter of which is incorporated herein by reference.

TECHNICAL FIELD

This specification relates to a method of manufacturing a spark plug provided with an electrode including a tip.

BACKGROUND

Spark plugs provided with an electrode including a tip are conventionally used. The tip of the electrode is joined to a base portion, which is a member supporting the tip, by welding or the like. During welding, in some cases, a metal piece, also referred to spatter, adheres to a joining portion to form a protruding portion. There have been proposed techniques for detecting such a protruding portion by using a captured image (see, for example, Japanese Patent Application Laid-open No. 2004-214218). Specifically, an image of a joining work member is captured by using an image capturing means to obtain a captured image. An outline of an outer surface of the joining work member in the captured image and a reference outline are used to check whether the outline of the joining work member is present within a non-allowed region around the reference outline. If the presence of the outline of the joining work member within the non-allowed region is confirmed, it is determined that a protruding portion is present.

A surface of a member to be welded, such as a tip, may include an unintended color portion such as a portion with stains, a portion having scratches, or an oxidized portion. Such a portion may cause a wrong outline to be identified in the captured image, resulting in a reduction in detection accuracy in some cases. This issue is an issue that is not specific to when a protruding portion is detected by using the outline but common to when the presence or absence of joining deficiency of the electrode is determined.

SUMMARY

This specification discloses a technique that enables appropriate determination of whether there is joining deficiency between a base portion of an electrode and a tip.

This specification discloses the following application examples, for example.

Application Example 1

A method of manufacturing a spark plug having an electrode, the electrode including a base portion and a tip joined to a specific surface that is a specific outer surface of the base portion, the tip forming a spark discharge surface, the method including:
generating three-dimensional coordinate data representing a three-dimensional shape of a target portion of the electrode including the base portion and the tip joined to the base portion, by identifying respective relative positions of a plurality of points on an outer surface of the target portion, the target portion being a portion including at least a portion of the specific surface of the base portion and the tip;
determining whether the target portion of the electrode includes a predetermined unintentional portion that is an unintended portion by analyzing the coordinate data;
excluding the electrode, which includes the unintentional portion, from objects to be manufactured; and
assembling the spark plug by using the electrode, which does not include the unintentional portion.

According to this configuration, the determination of whether the target portion of the electrode includes a predetermined unintentional portion that is an unintended portion is performed by using three-dimensional coordinate data representing the three-dimensional shape of the target portion. Thus, it can be appropriately determined whether there is joining deficiency between the base portion of the electrode and the tip.

Application Example 2

The method according to Application Example 1, wherein the step of generating the three-dimensional coordinate data includes a step of generating at least one of a first type of three-dimensional coordinate data representing relative coordinates based on the specific surface of the base portion and a second type of three-dimensional coordinate data representing relative coordinates based on the spark discharge surface of the tip.

According to this configuration, analysis is facilitated using at least one of a first type of three-dimensional coordinate data based on the specific surface of the base portion and a second type of three-dimensional coordinate data based on the spark discharge surface of the tip. Thus, appropriate determination can be performed.

Application Example 3

The method according to Application Example 1, wherein in the step of determining whether the target portion includes the unintentional portion,
on the basis of a result of analysis of the coordinate data, if the target portion of the electrode includes a first type of unintentional portion that is a portion located on one of two sides of the specific surface opposite to the base portion side when the target portion is viewed in a direction parallel to the specific surface of the base portion and located outside an edge of the specific surface when the target portion is viewed in a direction vertical to the specific surface, the target portion of the electrode is determined to include the unintentional portion.

According to this configuration, it can be appropriately determined that the target portion of the electrode includes the unintentional portion when a portion where the base portion and the tip are joined to each other protrudes outside an edge of the specific surface of the base portion.

Application Example 4

The method according to Application Example 1, wherein in the step of determining whether the target portion includes the unintentional portion,
on the basis of a result of analysis of the coordinate data, if the target portion of the electrode includes an opposite portion that is a portion located on one of two sides of the specific surface opposite to the base portion side when the target portion is viewed in a direction parallel to the specific surface of the base portion, and if the opposite portion includes a second type of unintentional portion that is a portion locally projecting in the direction parallel to the specific surface, the target portion of the electrode is determined to include the unintentional portion.

According to this configuration, it can be appropriately determined that the target portion of the electrode includes the unintentional portion when a portion where the base portion and the tip are joined to each other includes a locally projecting portion.

Application Example 5

The method according to Application Example 1, wherein
in the step of determining whether the target portion includes the unintentional portion,
on the basis of a result of analysis of the coordinate data,
if the target portion of the electrode includes a third type of unintentional portion that is a portion located on one of two sides of the spark discharge surface opposite to the tip side when the target portion is viewed in a direction parallel to the spark discharge surface of the tip, the target portion of the electrode is determined to include the unintentional portion.

According to this configuration, it can be appropriately determined that the target portion of the electrode includes the unintentional portion when a portion where the base portion and the tip are joined to each other projects from the spark discharge surface.

Note that the technique disclosed in this specification can be realized by using various aspects and can be realized in forms such as a method of manufacturing an electrode including a base portion and a tip joined to the base portion, an electrode manufactured by the method, a method of manufacturing a spark plug provided with an electrode including a base portion and a tip joined to the base portion, a spark plug manufactured by the method, a method of inspecting an electrode, and a method of inspecting a spark plug provided with an electrode.

BRIEF DESCRIPTION OF DRAWINGS

FIG. 4A and FIG. 4B are a flowchart illustrating an example of a method of preparing a ground electrode.

FIG. 5 is a schematic diagram illustrating an example of a measurement system 1000.

DETAILED DESCRIPTION

A. First Embodiment

Figure 1:
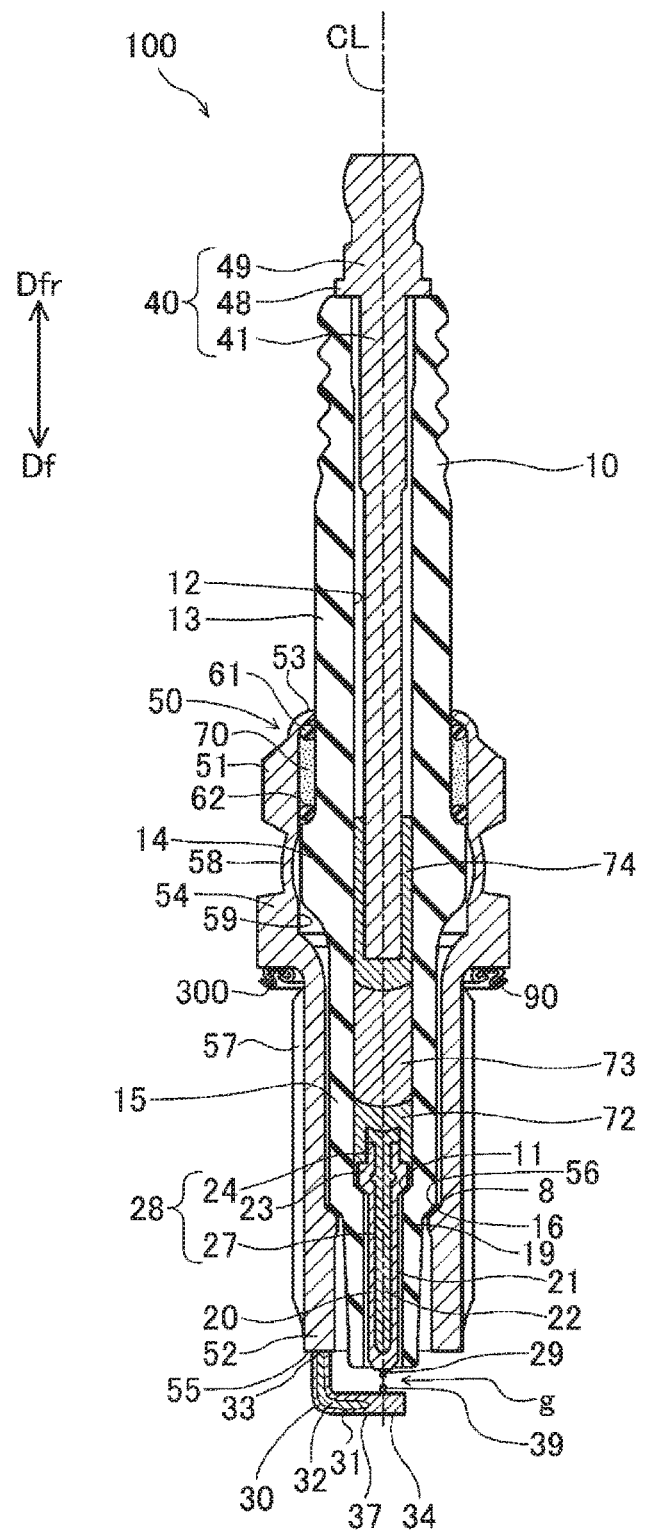
FIG. 1 is a sectional view of a spark plug 100 according to an embodiment.

A-1. Configuration of Spark Plug 100:

FIG. 1 is a sectional view of a spark plug 100 according to an embodiment. In the figure, a central axis CL (also referred to as an "axial line CL") of the spark plug 100 and a flat cross section of the spark plug 100 including the central axis CL are illustrated. In the following, a direction parallel to the central axis CL is also referred to as the "direction of the axial line CL", or simply as the "axial line direction" or "front-rear direction". A radial direction of a circle centered on the axial line CL is also referred to as the "radial direction". The radial direction is a direction vertical to the axial line CL. A direction of the circumference of a circle centered on the axial line CL is also referred to as the "circumferential direction". Among directions parallel to the central axis CL, the down direction in FIG. 1 is referred to as a front end direction Df or a front direction Df and the up direction is also referred to as a rear end direction Dfr or a rear direction Dfr. The front end direction Df is a direction directed from a metal terminal 40 to a center electrode 20 described below. Furthermore, the front end direction Df side in FIG. 1 is referred to as a front-end side of the spark plug 100, and the rear end direction Dfr side in FIG. 1 is referred to as a rear-end side of the spark plug 100.

The spark plug 100 includes a cylindrical insulator 10 having a through hole 12 (also referred to as an axial hole 12) extending along the axial line CL, a center electrode 20 held at the front-end side of the through hole 12, a metal terminal 40 held at the rear-end side of the through hole 12, a resistor 73 disposed in the through hole 12 between the center electrode 20 and the metal terminal 40, a conductive first seal portion 72 that is in contact with the center electrode 20 and the resistor 73 to electrically connect the members 20 and 73 to each other, a conductive second seal portion 74 that is in contact with the resistor 73 and the metal terminal 40 to electrically connect the members 73 and 40 to each other, a cylindrical metal shell 50 fixed on the outer peripheral side of the insulator 10, and a ground electrode 30 having an end joined to a front end surface 55 of the metal shell 50 and another end facing the center electrode 20 with a gap g therebetween.

A large diameter portion 14 having the largest outer diameter is formed in substantially the center of the insulator 10 in the axial line direction. A rear trunk portion 13 is formed closer to the rear-end side than the large diameter portion 14. A front trunk portion 15 having a smaller outer diameter than the rear trunk portion 13 is formed closer to the front-end side than the large diameter portion 14. A reduced outer diameter portion 16 and a leg portion 19 are further formed closer to the front-end side than the front trunk portion 15 in such a manner as to be arranged toward the front-end side in this order. The reduced outer diameter portion 16 has an outer diameter tapered toward the front direction Df. A reduced inner diameter portion 11 having an inner diameter tapered toward the front direction Df is formed in the vicinity of the reduced outer diameter portion 16 (in the example in FIG. 1, the front trunk portion 15). The insulator 10 is preferably formed taking into account the mechanical strength, thermal strength, and electrical strength. For example, the insulator 10 is formed by sintering alumina (any other insulating material may be used).

The center electrode 20 is a metal member and is arranged in the through hole 12 of the insulator 10 at its end on the front direction Df side. The center electrode 20 has a substantially cylindrical rod portion 28, and a first tip 29 joined (e.g., laser beam welded) to the front end of the rod portion 28. The rod portion 28 has a head portion 24, which is a portion on the rear direction Dfr side, and an axial portion 27 connected to the front direction Df side of the head portion 24. The axial portion 27 extends toward the front direction Df in parallel with the axial line CL. A portion of the head portion 24 that is on the front direction Df side has a collar portion 23 having a larger outer diameter than the outer diameter of the axial portion 27. A surface of the collar portion 23 that is on the front direction Df side is supported by the reduced inner diameter portion 11 of the insulator 10. The axial portion 27 is connected to the front direction Df side of the collar portion 23. The first tip 29 is joined to the front end of the axial portion 27.

The rod portion 28 has an outer layer 21 and a core portion 22 arranged on the inner circumferential side of the outer layer 21. The outer layer 21 is formed of a material having higher oxidation resistance than the core portion 22 (e.g., an alloy containing nickel as a main component). Here, the main component means a component having the highest percentage content (percent by weight (wt %)). The core portion 22 is formed of a material having higher thermal conductivity than the outer layer 21 (such as pure copper or an alloy containing copper as the main component). The first tip 29 is formed using a material having higher durability against discharge than the axial portion 27 (e.g., a noble metal such as iridium (Ir) or platinum (Pt)). A portion of the center electrode 20 at the front-end side, including the first tip 29, is exposed to the front direction Df side from the axial hole 12 in the insulator 10. The core portion 22 may be omitted. Further, the first tip 29 may be omitted.

The metal terminal 40 is a rod-shaped member extending in parallel with the axial line CL. The metal terminal 40 is formed using a material having conductivity (e.g., a metal containing iron as the main component). The metal terminal 40 has a cap attachment portion 49, a collar portion 48, and an axial portion 41, which are arranged in order toward the front direction Df. The axial portion 41 is inserted in a portion on the rear direction Dfr side of the axial hole 12 in the insulator 10. The cap attachment portion 49 is located on the rear-end side of the insulator 10 and is exposed to the outside from the axial hole 12.

Within the axial hole 12 in the insulator 10, the resistor 73 is arranged between the metal terminal 40 and the center electrode 20 to suppress electrical noise. The resistor 73 is formed using a material having conductivity (e.g., a mixture of glass, carbon particles, and ceramic particles). The first seal portion 72 is arranged between the resistor 73 and the center electrode 20, and the second seal portion 74 is arranged between the resistor 73 and the metal terminal 40. The seal portions 72 and 74 are formed using a material having conductivity (e.g., a mixture of metal particles and glass, which is the same as that contained in the material of the resistor 73). The center electrode 20 is electrically connected to the metal terminal 40 by using the first seal portion 72, the resistor 73, and the second seal portion 74.

The metal shell 50 is a cylindrical member having a through hole 59 extending along the axial line CL. The insulator 10 is inserted in the through hole 59 of the metal shell 50, and the metal shell 50 is fixed to the outer periphery of the insulator 10. The metal shell 50 is formed using a conductive material (e.g., a metal containing iron as the main component, such as carbon steel). A portion of the insulator 10 that is on the front direction Df side is exposed to the outside from the through hole 59. Further, a portion on the rear direction Dfr side of the insulator 10 is exposed to the outside from the through hole 59.

The metal shell 50 has a tool engagement portion 51 and a front trunk portion 52. The tool engagement portion 51 is a portion over which a wrench (not illustrated) for a spark plug is fitted. The front trunk portion 52 is a portion including the front end surface 55 of the metal shell 50. The front trunk portion 52 has formed on an outer peripheral surface thereof a screw portion 57 to be threaded into an installation hole in an internal combustion engine (e.g., a gasoline engine). The screw portion 57 is a portion where an external thread extending in the direction of the axial line CL is formed.

The metal shell 50 has formed on an outer peripheral surface thereof between the tool engagement portion 51 and the front trunk portion 52 a flange-shaped middle trunk portion 54 projecting outward in the radial direction. The middle trunk portion 54 has a larger outer diameter than the maximum outer diameter of the screw portion 57 (i.e., the outer diameter of the top of the thread ridge). A surface 300 on the front direction Df side of the middle trunk portion 54 is a seating portion that forms a seal with an installation portion (e.g., an engine head) that is a portion forming the installation hole in the internal combustion engine.

An annular gasket 90 is arranged between the screw portion 57 of the front trunk portion 52 and the seating portion 300 of the middle trunk portion 54. The gasket 90 is crushed and deformed when the spark plug 100 is installed in the internal combustion engine, sealing the clearance between the seating portion 300 of the middle trunk portion 54 of the spark plug 100 and the installation portion (e.g., the engine head) of the internal combustion engine (not illustrated). The gasket 90 may be omitted. In this case, the seating portion 300 of the middle trunk portion 54 is brought into direct contact with the installation portion of the internal combustion engine, thereby sealing the clearance between the seating portion 300 and the installation portion of the internal combustion engine.

The front trunk portion 52 of the metal shell 50 has a reduced inner diameter portion 56 having an inner diameter tapered toward the front-end side. A front-end-side packing 8 is held between the reduced inner diameter portion 56 of the metal shell 50 and the reduced outer diameter portion 16 of the insulator 10. In this embodiment, the front-end-side packing 8 is, for example, a plate-shaped ring made of iron (any other material (e.g., a metal material such as copper) may be used).

A crimping portion 53 that is a thin portion is formed closer to the rear-end side than the tool engagement portion 51 of the metal shell 50 (the crimping portion 53 is a rear-end portion forming the rear end of the metal shell 50). Further, a buckling portion 58 that is a thin portion is formed between the middle trunk portion 54 and the tool engagement portion 51. Annular ring members 61 and 62 are inserted between an inner peripheral surface of the metal shell 50 from the tool engagement portion 51 to the crimping portion 53 and an outer peripheral surface of the rear trunk portion 13 of the insulator 10. Further, a space between the ring members 61 and 62 is filled with a powder of talc 70. When the crimping portion 53 is bent inwards and crimped in the manufacturing process of the spark plug 100, the buckling portion 58 is deformed outward (buckled) in accordance with the application of a compressive force, which results in the metal shell 50 and the insulator 10 being fixed. The talc 70 is compressed in the crimping process and airtightness between the metal shell 50 and the insulator 10 is increased. In addition, the packing 8 is pressed between the reduced outer diameter portion 16 of the insulator 10 and the reduced inner diameter portion 56 of the metal shell 50 and then seals between the metal shell 50 and the insulator 10.

The ground electrode 30 is a metal member and has a rod-shaped body portion 37 and a second tip 39 attached to a front end portion 34 of the body portion 37. The body portion 37 has another end portion 33 (also referred to as a base end portion 33) joined (e.g., resistance welded) to the front end surface 55 of the metal shell 50. The body portion 37 extends in the front end direction Df from the base end portion 33 joined to the metal shell 50, bends toward the central axis CL, and reaches the front end portion 34. The second tip 39 is fixed (e.g., resistance welded or laser beam welded) to a portion on the rear direction Dfr side of the front end portion 34. The body portion 37 corresponds to a base portion to which the tip 39 is joined. The second tip 39 of the ground electrode 30 and the first tip 29 of the center electrode 20 define the gap g therebetween. That is, the second tip 39 of the ground electrode 30 is arranged at the front direction Df side of the first tip 29 of the center electrode 20, and faces the first tip 29 with the gap g interposed therebetween. The second tip 39 is formed using a material having higher durability against discharge than the body portion 37 (e.g., a noble metal such as iridium (Ir) or platinum (Pt)). The second tip 39 may be omitted.

The body portion 37 has an outer layer 31 and an inner layer 32 arranged on the inner circumferential side of the outer layer 31. The outer layer 31 is formed of a material having higher oxidation resistance than the inner layer 32 (e.g., an alloy containing nickel as the main component). The inner layer 32 is formed of a material having higher thermal conductivity than the outer layer 31 (such as pure copper or an alloy containing copper as the main component). The inner layer 32 may be omitted.

Figure 2:
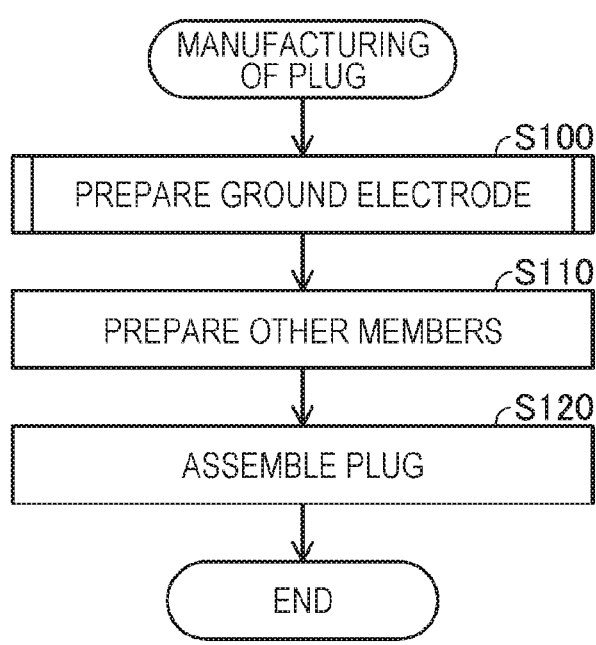
FIG. 2 is a flowchart illustrating an example of a method of manufacturing the spark plug 100.
Figure 3A:
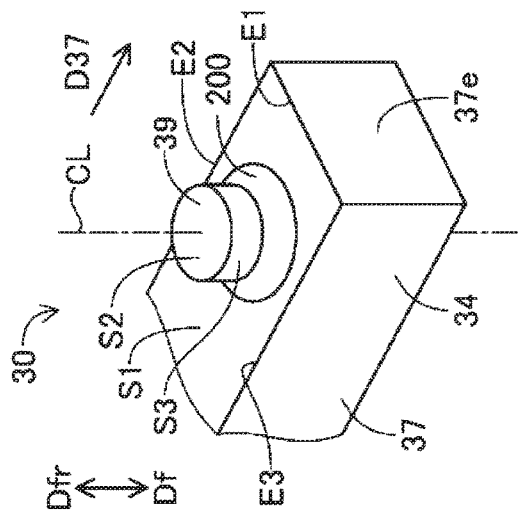
FIG. 3A to FIG. 3E are explanatory diagrams of a body portion 37 and a second tip 39.
Figure 3B:
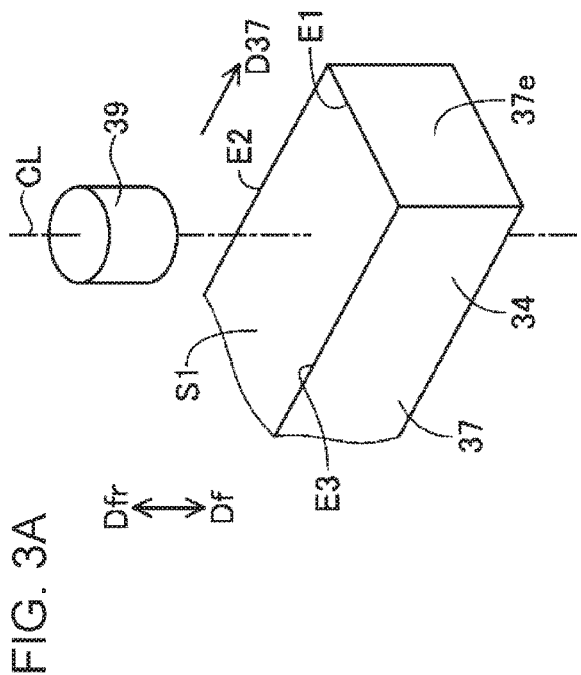

A-2. Manufacturing Method:

FIG. 2 is a flowchart illustrating an example of a method of manufacturing the spark plug 100. In S100, the rod-shaped ground electrode 30 is prepared. In this embodiment, the rod-shaped body portion 37, which is not bent, and the second tip 39 are prepared. Any of various well-known methods can be adopted as a method for preparing these members (the detailed description thereof is omitted). Then, the second tip 39 is joined to the front end portion 34 of the body portion 37 by resistance welding. FIG. 3A illustrates a perspective view of the body portion 37 and the second tip 39 before they are joined to each other, and FIG. 3B illustrates the body portion 37 and the second tip 39 after they are joined to each other. In the figures, the central axis CL and the directions Df and Dfr represent the central axis CL and the directions Df and Dfr when viewed from the front end portion 34 of the body portion 37 and the second tip 39 in the finished spark plug 100 (FIG. 1). In the following, a positional relationship will be described using the axial line CL and the directions Df and Dfr. As illustrated in the figures, the second tip 39 is joined to a surface S1 on the rear direction Dfr side of the front end portion 34 of the body portion 37 (hereinafter also referred to as a specific surface S1). A surface S2 on the rear direction Dfr side of the second tip 39 is a spark discharge surface (hereinafter also referred to as the spark discharge surface S2). In the figures, edges E1, E2, and E3 of the specific surface S1 are also illustrated. The edge E1 is an edge indicating the front end of the specific surface S1. The edge E1 indicates a portion connecting the specific surface S1 and a front end surface 37e of the body portion 37 to each other. The edges E2 and E3 represent edges of the front end portion 34 in a direction vertical to a direction D37 in which the front end portion 34 extends toward the front end surface 37e (the direction D37 is also referred to as an extension direction D37). In this embodiment, the extension direction D37 is a direction directed toward the front end surface 37e vertically to the axial line CL.

Figure 3E:
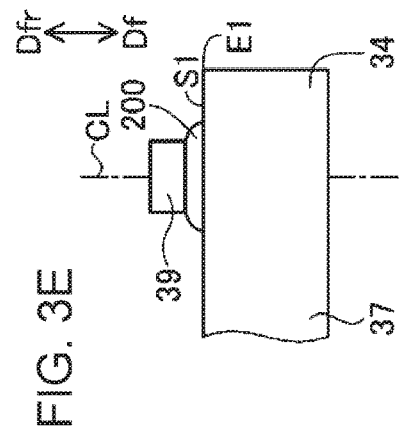
Figure 3D:
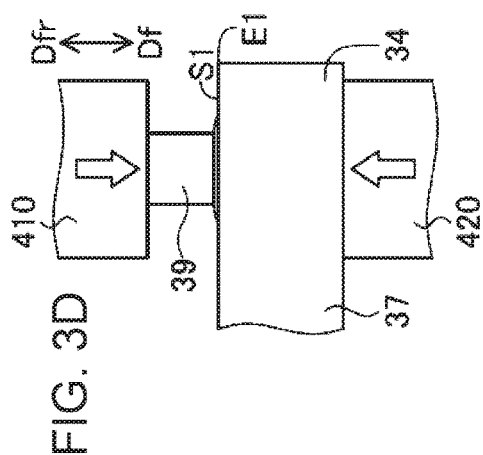
Figure 3C:
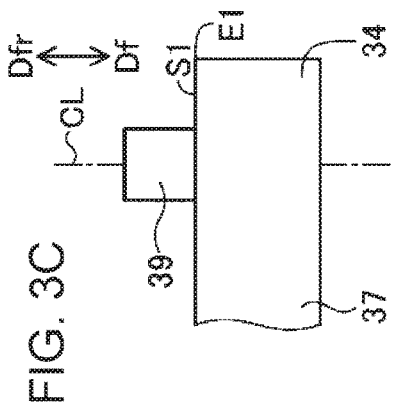

FIG. 3C to FIG. 3E are explanatory diagrams of how the front end portion 34 and the second tip 39 are joined to each other. Each figure illustrates an external appearance of the body portion 37 and the second tip 39 when viewed in a direction vertical to the front direction Df. First, as illustrated in FIG. 3C, the second tip 39 is placed on the specific surface S1 on the rear direction Dfr side of the front end portion 34. Then, as illustrated in FIG. 3D, a first support portion 410 is pressed against a surface on the rear direction Dfr side of the second tip 39, and a second support portion 420 is pressed against a surface on the front direction Df side of the front end portion 34. The support portions 410 and 420 are formed of a conductive material (e.g., stainless steel). Then, a voltage for resistance welding is applied between the support portions 410 and 420. Thus, current flows through the front end portion 34 and the second tip 39. The flow of current leads to melting of a portion where the specific surface S1 on the rear direction Dfr side of the front end portion 34 and a surface on the front direction Df side of the second tip 39 are in contact with each other, resulting in the front end portion 34 and the second tip 39 being joined to each other.

FIG. 3E illustrates the external appearance after welding. As illustrated in the figure, a joining portion 200 is formed in a boundary portion of the front end portion 34 and the second tip 39. As illustrated in FIG. 3B, the joining portion 200 is formed around the entire perimeter of a boundary portion of the specific surface S1 of the front end portion 34 and an outer peripheral surface S3 of the second tip 39. The joining portion 200 is a portion where the front end portion 34 and the second tip 39 are joined to each other. The joining portion 200 is a portion produced as a result of a molten portion of the front end portion 34 and the second tip 39 being cooled and solidified during welding (also referred to as the molten portion 200). The joining portion 200 includes the components of the front end portion 34 and the components of the second tip 39. In other words, the joining portion 200 is an alloy layer of the components of the front end portion 34 and the components of the second tip 39. The joining portion 200 is also a portion where the front end portion 34 and the second tip 39 are integrated into a single unit.

Note that the shape of the joining portion 200 may differ among a plurality of ground electrodes 30. In FIG. 3B, the joining portion 200 having an appropriate shape is illustrated. In this embodiment, the appropriate joining portion 200 is formed inside the edges E1, E2, and E3 of the specific surface S1 of the front end portion 34 and within a range on the body portion 37 side rather than on the spark discharge surface S2 of the second tip 39. Further, the joining portion 200 has a surface that defines a smooth curved surface. However, even if the body portion 37 and the second tip 39 are joined to each other by using the same method, an unintended portion may be formed in a joining portion. In some cases, for example, a joining portion may expand over the specific surface S1 of the front end portion 34 and protrude outward from the edge E1, E2, or E3 of the specific surface S1. In other cases, due to the presence of spatter, a long, narrow, thorn-like projection portion may be formed in a joining portion. In still other cases, a joining portion may expand to the rear direction Dfr side beyond the spark discharge surface S2 of the second tip 39. If such an unintended portion is formed in a joining portion, deficiency may occur. For example, a discharge may occur at a joining portion rather than at the spark discharge surface S2. Alternatively, during the transport of spark plugs, a projecting portion of a joining portion may come into contact with other members and a ground electrode may be damaged.

In this embodiment, accordingly, in S100 in FIG. 2, the three-dimensional shape of a joining portion is identified, and it is determined whether the joining portion includes an unintended portion. If it is determined that the joining portion includes no unintended portion, a ground electrode is used as a member for manufacturing the spark plug 100. If it is determined that the joining portion includes an unintended portion, the ground electrode is excluded from the objects to be manufactured. The details of these processes will be described below.

In S110 in FIG. 2, members other than the ground electrode 30 are prepared. Specifically, members including the metal shell 50, the insulator 10, the center electrode 20, respective powder materials of the seal portions 72 and 74 and the resistor 73, and the metal terminal 40 are prepared. Any of various well-known methods can be adopted as a method for preparing these members (the detailed description thereof is omitted). The preparation of the ground electrode (S100) and the preparation of the other members (S110) are performed independently.

In S120, the spark plug 100 is assembled by using the prepared members. For example, first, an assembly including the insulator 10, the center electrode 20, and the metal terminal 40 is created. For example, the center electrode 20 is inserted into an opening at the rear direction Dfr side of the insulator 10. The center electrode 20 is supported by the reduced inner diameter portion 11 of the insulator 10 and is thus arranged in the through hole 12 at a predetermined position. Then, the respective material powders of the first seal portion 72, the resistor 73, and the second seal portion 74 are introduced and the introduced powder materials are shaped in the order of the members 72, 73, and 74. The powder materials are introduced into the through hole 12 from the opening at the rear direction Dfr side of the insulator 10. Then, the insulator 10 is heated to a predetermined temperature higher than the softening point of the glass component contained in the material powders of the members 72, 73, and 74, and the axial portion 41 of the metal terminal 40 is inserted into the through hole 12 from the opening at the rear direction Dfr side of the insulator 10 with the insulator 10 being heated to the predetermined temperature. As a result, the material powders of the members 72, 73, and 74 are compressed and sintered to form the members 72, 73, and 74. Then, the metal terminal 40 is fixed to the insulator 10. Further, the ground electrode 30 is joined (e.g., resistance welded) to the metal shell 50.

Then, the assembly described above, including the insulator 10, is fixed to the metal shell 50. Specifically, the front-end-side packing 8, the assembly, the ring member 62, the talc 70, and the ring member 61 are arranged in the through hole 59 of the metal shell 50, and then the crimping portion 53 of the metal shell 50 is crimped so as to bend inward, thereby allowing the insulator 10 to be fixed to the metal shell 50. Then, the rod-shaped ground electrode 30 is bent to adjust the distance of the gap g. Accordingly, the spark plug 100 is finished.

Figure 4A:
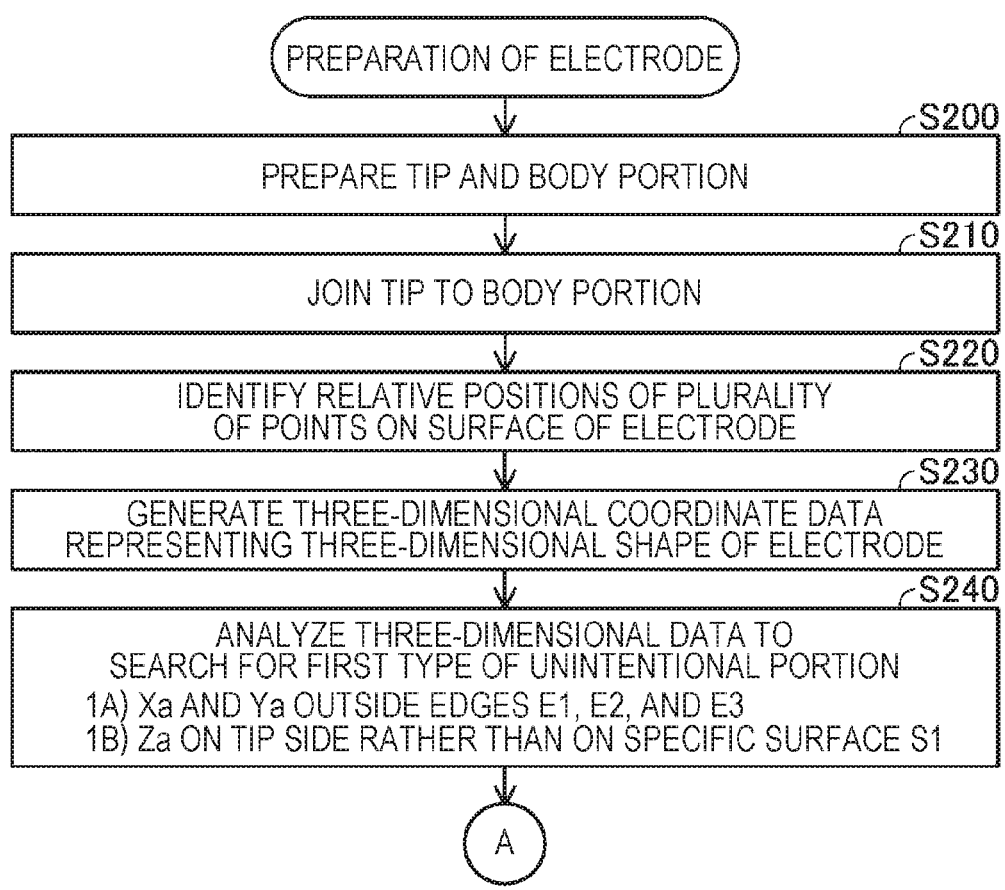

FIG. 4A and FIG. 4B are a flowchart illustrating an example of the method for preparing a ground electrode in S100 in FIG. 2. In S200, the rod-shaped body portion 37 and the second tip 39 are prepared. In S210, the second tip 39 is joined to the body portion 37. Steps S200 and S210 have been described with reference to FIG. 3A to FIG. 3E. In S220, respective relative positions of a plurality of points on an outer surface of a target portion of the ground electrode 30, including the second tip 39, are identified by using a distance measurement device.

FIG. 5 is a schematic diagram illustrating an example of a measurement system 1000. In this embodiment, the measurement system 1000 includes a distance measurement system 700 and a control device 800 that controls the distance measurement system 700. The distance measurement system 700 includes a distance measurement device 710 and a support device 720 capable of supporting the distance measurement device 710 and moving the distance measurement device 710. The distance measurement device 710 is a device that measures a distance between the distance measurement device 710 and a measurement target. Any configuration can be used as a configuration of the distance measurement device 710. In this embodiment, the distance measurement device 710 is a laser rangefinder. The distance measurement device 710 applies a laser beam Lz1 to the measurement target in a predetermined irradiation direction LD and receives a reflected beam Lz2 from the measurement target. Then, the distance measurement device 710 identifies the distance between the distance measurement device 710 and the measurement target in the irradiation direction LD by using the laser beam Lz1 and the reflected beam Lz2 (e.g., by using a phase difference). The distance resolution is less than or equal to 20 μm, for example. In this embodiment, furthermore, the distance measurement device 710 is capable of measuring a distance between each of a plurality of measuring positions having different locations in a scanning direction SD and the distance measurement device 710 in the irradiation direction LD (the scanning direction SD is a predetermined direction vertical to the irradiation direction LD). For example, the distance measurement device 710 moves an optical system (such as a lens) included in the distance measurement device 710 to move the outgoing position or irradiation direction of the laser beam Lz1 to change a measuring position in the scanning direction SD.

In this embodiment, the ground electrode 30 is arranged at a position away from the distance measurement device 710 by a predetermined distance in the irradiation direction LD. The orientation of the ground electrode 30 toward the distance measurement device 710 is adjusted so that the spark discharge surface S2 of the second tip 39 is directed toward the distance measurement device 710 and the extension direction D37 of the front end portion 34 approximately coincides with a predetermined target direction Dt37. In this state, the irradiation direction LD is approximately vertical to the specific surface S1 of the ground electrode 30, approximately vertical to the spark discharge surface S2, and approximately the same as the front direction Df relative to the ground electrode 30. The scanning direction SD is approximately vertical to the extension direction D37.

The support device 720 includes an arm 722 that supports the distance measurement device 710, and a drive source 724 (e.g., an electric motor) that moves the arm 722. The support device 720 is capable of moving the position of the distance measurement device 710 in a movement direction MD that is a direction intersecting the scanning direction SD. In this embodiment, the movement direction MD is a direction vertical to the scanning direction SD and the irradiation direction LD.

In the figure, a plurality of points Mp represent measuring positions at which distances are measured by the distance measurement system 700 (also referred to as measuring positions Mp). As illustrated in the figure, the plurality of measuring positions Mp are distributed over a surface on the rear direction Dfr side of a target portion 30t of the ground electrode 30. The target portion 30t is a portion including the second tip 39 and a portion of the specific surface S1 that surrounds the second tip 39. The target portion 30t includes the joining portion 200, the edge E1, a portion of the edge E2 that is oriented in the extension direction D37, and a portion of the edge E3 that is oriented in the extension direction D37. The plurality of measuring positions Mp are arranged in such a manner as to be distributed approximately uniformly over the surface on the rear direction Dfr side of the target portion 30t. The plurality of measuring positions Mp are also arranged outside the ground electrode 30 (the reason for this will be described below). In this embodiment, the plurality of measuring positions Mp are arranged in a grid-like pattern.

The control device 800 is, for example, a personal computer (e.g., a desktop computer or a tablet computer). The control device 800 includes a processor 810, a storage device 815, a display unit 840 that displays an image, an operation unit 850 that accepts an operation performed by a user, and an interface 870. The storage device 815 includes a volatile storage device 820 and a non-volatile storage device 830. The elements of the control device 800 are connected to one another via a bus.

The processor 810 is a device that performs data processing and is, for example, a CPU. The volatile storage device 820 is, for example, a DRAM, and the non-volatile storage device 830 is, for example, a flash memory. The non-volatile storage device 830 stores a program 832. The processor 810 executes the program 832 to control the distance measurement system 700 to inspect the joining portion 200 (the details thereof will be described below). The processor 810 temporarily stores in the storage device 815 (e.g., any one of the volatile storage device 820 and the non-volatile storage device 830) various pieces of intermediate data to be utilized to execute the program 832.

The display unit 840 is a device that displays an image and is, for example, a liquid crystal display. The operation unit 850 is a device that receives an operation performed by a user and is, for example, a touch panel arranged to be superimposed on the display unit 840. The user can operate the operation unit 850 to input various instructions to the control device 800. The interface 870 is an interface (e.g., a USB interface) for communicating with other devices. The distance measurement system 700 (specifically, the distance measurement device 710 and the support device 720) is connected to the interface 870.

In S220 in FIG. 4A, the user operates the operation unit 850 of the control device 800 to input an instruction to start an inspection process. In response to the instruction, the processor 810 starts an inspection process in accordance with the program 832. Specifically, in S220, the processor 810 controls the distance measurement device 710 to cause the distance measurement device 710 to measure the respective distances at the plurality of measuring positions Mp having different locations in the scanning direction SD and obtains distance information indicating the distances from the distance measurement device 710. Further, the processor 810 controls the support device 720 to move the position of the distance measurement device 710 in the movement direction MD. The processor 810 alternately repeats the measurement of a distance and the movement of the distance measurement device 710 to obtain distance information on each of the plurality of measuring positions Mp. The distances at the measuring positions Mp change in accordance with the positions on the outer surface of the target portion 30t of the ground electrode 30. For example, the spark discharge surface S2 is positioned on the distance measurement device 710 side of the specific surface S1. Thus, the distances at the measuring positions Mp on the spark discharge surface S2 are shorter than the distances at the measuring positions Mp on the specific surface S1.

The processor 810 controls the support device 720 and is thus capable of identifying each of a plurality of positions of the distance measurement device 710 in the movement direction MD, which is moved by the support device 720. In S220, the processor 810 obtains geometry information indicating correspondence relationships among the positions of the distance measurement device 710 in the movement direction MD, the locations of the measuring positions Mp in the scanning direction SD, and measured distances. One correspondence relationship represents one measuring position Mp. The geometry information indicates the respective correspondence relationships for the plurality of measuring positions Mp. Note that the irradiation direction LD of the laser beam Lz1 is determined in advance. Accordingly, the geometry information indicates the respective relative three-dimensional locations of the plurality of measuring positions Mp on the outer surface on the rear direction Dfr side of the target portion 30t of the ground electrode 30. In other words, the processor 810 obtains geometry information in this way, thereby identifying the relative three-dimensional location of each of the plurality of measuring positions Mp.

In FIG. 5, the plurality of measuring positions Mp are illustrated in simple form. In actuality, the respective distances at multiple measuring positions Mp, which are arranged in higher density, are measured. In addition, the plurality of measuring positions Mp are distributed widely outside the edges E1, E2, and E3 of the specific surface S1. As described below, when the joining portion 200 extends outside the edge E1, E2, or E3, distances at measuring positions Mp in the extending portion are also measured.

At a measuring position Mp outside the target portion 30t, a distance significantly larger than the distance between the distance measurement device 710 and the ground electrode 30 is measured. Thus, if a distance exceeds a predetermined threshold, the measuring position Mp corresponding to the distance can be determined to be outside the target portion 30t. The distance threshold is set to a larger value than a range within which the distances at the measuring positions Mp in the target portion 30t can be measured.

In S230 in FIG. 4A, the processor 810 generates three-dimensional coordinate data representing the three-dimensional shape of the target portion 30t of the ground electrode 30 (also referred to simply as three-dimensional data) by using the geometry information obtained in S220. The three-dimensional data is data indicating the coordinates of each of the plurality of measuring positions Mp measured in S220. In the following, a point represented by three-dimensional coordinates is also referred to as a coordinate point.

Figure 6A:
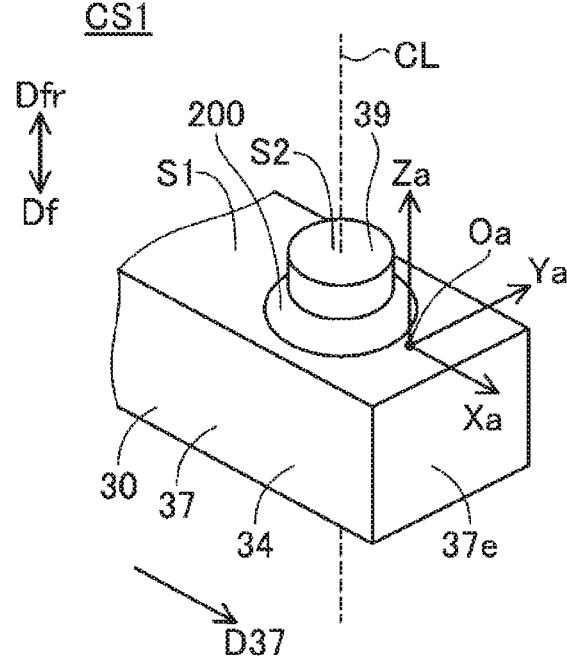
FIG. 6A and FIG. 6B are explanatory diagrams of a coordinate system representing three-dimensional coordinates.
Figure 6B:
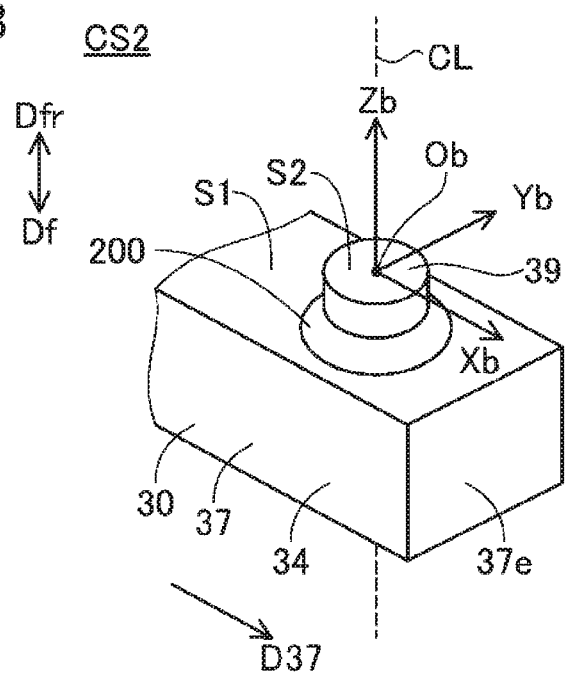

FIG. 6A and FIG. 6B are explanatory diagrams of a coordinate system representing three-dimensional coordinates. In a first coordinate system CS1 in FIG. 6A, an origin Oa is arranged on the specific surface S1. Three coordinate axes Xa, Ya, and Za vertical to one another extend from the origin Oa. A first axis Xa and a second axis Ya are coordinate axes approximately parallel to the specific surface S1, and a third axis Za is a coordinate axis approximately vertical to the specific surface S1. The first axis Xa has a positive direction that approximately coincides with the extension direction D37 of the front end portion 34 of the body portion 37. The second axis Ya is approximately vertical to the extension direction D37. The third axis Za has a positive direction that approximately coincides with the rear direction Dfr.

When coordinates indicated by the first coordinate system CS1 are used, it can be easily identified whether a coordinate point is on the rear direction Dfr side rather than on the specific surface S1 by referring to the coordinate in the third axis Za without referring to the coordinates in the first axis Xa and the second axis Ya. In addition, it can be easily identified whether a position of a coordinate point in a direction parallel to the specific surface S1 is outside the edges E1, E2, and E3 of the specific surface S1 by referring to the coordinate in the first axis Xa and the coordinate in the second axis Ya without referring to the coordinate in the third axis Za.

In a second coordinate system CS2 in FIG. 6B, an origin Ob is arranged on the spark discharge surface S2. Three coordinate axes Xb, Yb, and Zb vertical to one another extend from the origin Ob. A first axis Xb and a second axis Yb are coordinate axes approximately parallel to the spark discharge surface S2, and a third axis Zb is a coordinate axis approximately vertical to the spark discharge surface S2. The first axis Xb has a positive direction that approximately coincides with the extension direction D37 of the front end portion 34 of the body portion 37. The second axis Yb is approximately vertical to the extension direction D37. The third axis Zb has a positive direction that approximately coincides with the rear direction Dfr. When coordinates indicated by the second coordinate system CS2 are used, it can be easily identified whether a coordinate point is on the rear direction Dfr side beyond the spark discharge surface S2 by referring to the coordinate in the third axis Zb without referring to the coordinates in the first axis Xb and the second axis Yb.

In the following, the positive direction of the first axis Xa is also referred to as a +Xa direction, and the negative direction of the first axis Xa is also referred to as a −Xa direction. Similar signs are used for the positive directions and negative directions of the other axes Ya, Za, Xb, Yb, and Zb.

In S230 in FIG. 4A, the processor 810 generates both a first type of three-dimensional data represented in the first coordinate system CS1 and a second type of three-dimensional data represented in the second coordinate system CS2. Such three-dimensional data is generated by analyzing the geometry information. For example, the processor 810 generates three-dimensional data in accordance with the following procedure.

The processor 810 calculates coordinates of each of the plurality of measuring positions Mp from the geometry information, that is, from the positions of the distance measurement device 710 in the movement direction MD (FIG. 5) associated with the measuring positions Mp, the locations of the measuring positions Mp in the scanning direction SD, and the distances in the irradiation direction LD. The coordinates to be calculated are represented in a predetermined reference coordinate system (e.g., a coordinate system whose origin is a specific position of the distance measurement device 710). Then, the processor 810 converts the coordinates of each of the plurality of measuring positions Mp into coordinates in the first coordinate system CS1 to generate a first type of three-dimensional data. The first type of three-dimensional data is data indicating relative coordinates based on the specific surface S1 and represents the three-dimensional shape of the surface on the rear direction Dfr side of the target portion 30t. The processor 810 further converts the coordinates of each of the plurality of measuring positions Mp into coordinates in the second coordinate system CS2 to generate a second type of three-dimensional data. The second type of three-dimensional data is data indicating relative coordinates based on the spark discharge surface S2 and represents the three-dimensional shape of the surface on the rear direction Dfr side of the target portion 30t.

Any of various methods can be adopted as a method for identifying a first correspondence relationship between the reference coordinate system and the first coordinate system CS1 and a second correspondence relationship between the reference coordinate system and the second coordinate system CS2. For example, the processor 810 identifies the first correspondence relationship and the second correspondence relationship in accordance with the following procedure.

The processor 810 extracts measuring positions Mp in the target portion 30t from among the plurality of measuring positions Mp. For example, the processor 810 extracts measuring positions Mp at which the distances are less than or equal to a predetermined threshold as measuring positions Mp in the target portion 30t. In the following, the extracted measuring positions Mp are also referred to as target positions Mpt (FIG. 5). Further, the measuring positions Mp that are not extracted (that is, the measuring positions Mp outside the target portion 30t) are also referred to as outside positions Mpo.

The processor 810 extracts a specific surface group constituted by target positions Mpt in the specific surface S1 and a spark discharge surface group constituted by target positions Mpt on the spark discharge surface S2 from among the plurality of target positions Mpt. The distances for the specific surface group are longer than the distances for the spark discharge surface group. Further, differences between the distances for the specific surface group and the distances for the spark discharge surface group are approximately the same as a reference distance that is a standard distance between the specific surface S1 of the ground electrode 30 and the spark discharge surface S2. Any of various methods can be adopted as a method for extracting the specific surface group and the spark discharge surface group. For example, the processor 810 generates a histogram of the distances at the plurality of target positions Mpt and identifies a plurality of peaks in the histogram. Then, the processor 810 searches the plurality of peaks for two peaks for which the distance difference is the reference distance. When a plurality of candidates of two peaks are found, two peaks in which the total number of target positions Mpt is the largest are used. The processor 810 uses, from among the found two peaks, a group of target positions Mpt constituting the peak having the longer distance as a specific surface group, and a group of target positions Mpt constituting the peak having the shorter distance as a spark discharge surface group.

The processor 810 approximates the coordinates of the plurality of target positions Mpt in the specific surface group with a plane to calculate an approximation plane representing the specific surface S1. Then, the processor 810 arranges the origin Oa on the calculated approximation plane. The processor 810 uses as the third axis Za an axis extending through the origin Oa and vertical to the approximation plane. The processor 810 further calculates a direction that is parallel to the approximation plane and that is closest to the predetermined target direction Dt37 (FIG. 5). Then, the processor 810 uses as the first axis Xa an axis extending through the origin Oa and parallel to the calculated direction. The processor 810 further uses as the second axis Ya an axis extending through the origin Oa and vertical to the first axis Xa and the third axis Za. Accordingly, the first coordinate system CS1 is determined. Then, the processor 810 identifies the correspondence relationship between the reference coordinate system and the first coordinate system CS1 by using the determined first coordinate system CS1.

The processor 810 also identifies the correspondence relationship between the reference coordinate system and the second coordinate system CS2 in a similar way. The coordinates of the plurality of target positions Mpt in the spark discharge surface group are approximated with a plane to calculate an approximation plane representing the spark discharge surface S2. The origin Ob is arranged on the calculated approximation plane. An axis extending through the origin Ob and vertical to the approximation plane is used as the third axis Zb. A direction that is parallel to the approximation plane and that is closest to the predetermined target direction Dt37 (FIG. 5) is calculated, and an axis extending through the origin Oa and parallel to the calculated direction is used as the first axis Xb. An axis extending through the origin Ob and vertical to the first axis Xb and the third axis Zb is used as the second axis Yb. Accordingly, the second coordinate system CS2 is determined. Then, the processor 810 identifies the correspondence relationship between the reference coordinate system and the first coordinate system CS1 by using the determined second coordinate system CS2.

Figure 7A:
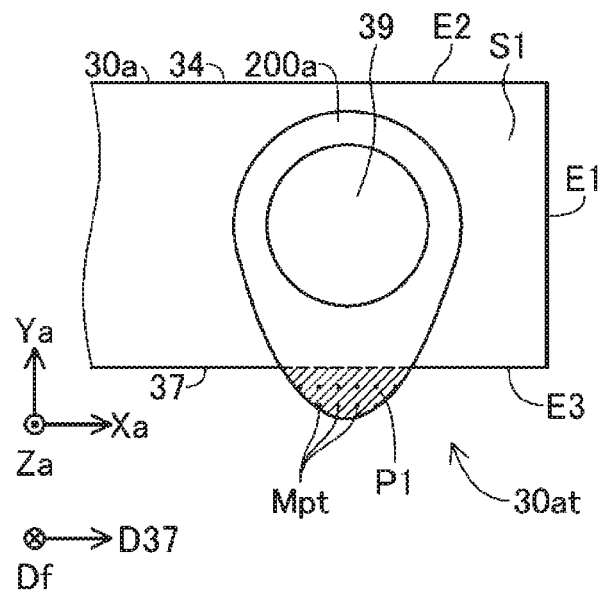
FIG. 7A and FIG. 7B are explanatory diagrams of a first type of unintentional portion.
Figure 7B:
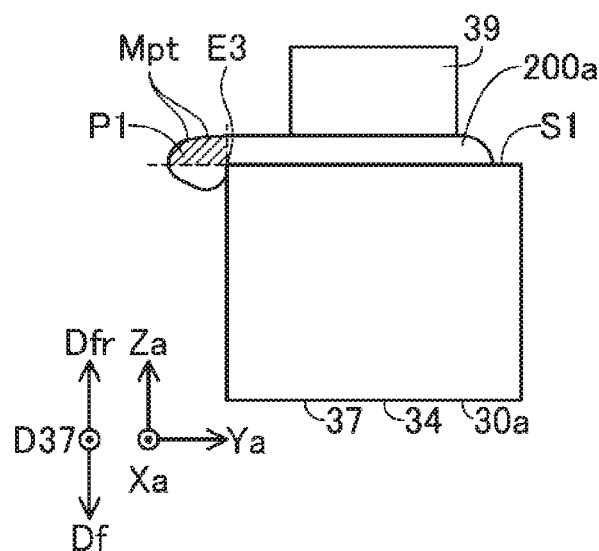

In S240 in FIG. 4A, the processor 810 analyzes the first type of three-dimensional data to search for a first type of unintentional portion. FIG. 7A and FIG. 7B are explanatory diagrams of the first type of unintentional portion. FIG. 7A illustrates a ground electrode 30a, as viewed when one is facing the front direction Df (i.e., in the −Za direction), and FIG. 7B illustrates the ground electrode 30a, as viewed when one is facing a direction opposite to the extension direction D37 (i.e., in the −Xa direction). In the figures, the directions Xa, Ya, and Za indicate the positive directions of the coordinate axes Xa, Ya, and Za, respectively, independently of the position of the origin Oa. In the following, description will be given with reference to the ground electrode 30a in FIG. 7A and FIG. 7B.

In the ground electrode 30a illustrated in the figures, a joining portion 200a extends beyond and outside the edge E3 of the specific surface S1. Such an unintended joining portion extending outside the edge E1, E2, or E3 of the specific surface S1 may be formed due to a variety of factors. An unintended projecting portion of the joining portion 200a may come into contact with other members (e.g., other spark plugs) during the transport of spark plugs and such a contact may damage the ground electrode 30a (e.g., the second tip 39 may be removed from the body portion 37). Such a joining portion includes a first type of unintentional portion, which is a portion outside the edge E1, E2, or E3 of the specific surface S1 and is a portion on the second tip 39 side rather than on the specific surface S1. In the example in FIG. 7A and FIG. 7B, a portion P1 indicated by hatching is the first type of unintentional portion.

The processor 810 analyzes the first type of three-dimensional data to identify respective lines approximating the edges E1, E2, and E3 of the specific surface S1 on the approximation plane representing the specific surface S1. Any of various methods can be adopted as a method for calculating lines approximating the edges E1, E2, and E3. For example, the processor 810 extracts a plurality of target positions Mpt forming an end on the +Xa direction side of an area where the plurality of target positions Mpt (FIG. 5) in the group representing the specific surface S1 are distributed. Any of various methods can be adopted as a method for extracting the target positions Mpt forming the end. For example, target positions Mpt having adjacent thereto on the +Xa side measuring positions Mp that are outside positions Mpo may be extracted as the target positions Mpt forming the end on the +Xa direction side. The extracted plurality of target positions Mpt are a plurality of target positions Mpt arranged along the edge E1.

The processor 810 calculates lines approximating a plurality of coordinate points representing the extracted plurality of target positions Mpt (here, coordinate points represented by two-dimensional coordinates in the first axis Xa and the second axis Ya). A line suitable for the shape of the edge E1 is used as an approximation line. When the edge E1 is linear, an approximation straight line is calculated. When the edge E1 is curved, an approximation curve (e.g., a curve represented by a spline function) is calculated. A line approximating the edge E2 and a line approximating the edge E3 are also calculated in a similar way.

The processor 810 searches the plurality of target positions Mpt representing the target portion 30t for any target position Mpt satisfying the following conditions 1A and 1B.

<Condition 1A> The two-dimensional coordinates in the first axis Xa and the second axis Ya are coordinates outside an area surrounded by the approximation lines of the edges E1, E2, and E3.

<Condition 1B> The coordinate in the third axis Za is a coordinate on the second tip 39 side rather than on the specific surface S1 (specifically, the approximation plane of the specific surface S1).

A target position Mpt satisfying the conditions 1A and 1B represents one of the measuring positions Mp in the first type of unintentional portion such as the portion P1 in FIG. 7A and FIG. 7B.

In S250 in FIG. 4B, the processor 810 determines whether any target position Mpt satisfying the conditions 1A and 1B is found. The fact that there is found any target position Mpt satisfying the conditions 1A and 1B indicates that a target portion of a ground electrode, such as a target portion 30at of the ground electrode 30a as in FIG. 7A and FIG. 7B, includes the first type of unintentional portion. If any target position Mpt satisfying the conditions 1A and 1B is found, that is, if the target portion is determined to include the first type of unintentional portion (S250: Yes), the ground electrode is rejected and excluded from the objects to be manufactured (S298). In S298, the processor 810 outputs result information indicating a determination result to a device that accepts the result information. For example, the processor 810 outputs the result information to the display unit 840 and causes the display unit 840 to display the determination result. The user can identify the determination result by observing the display unit 840. Alternatively, the processor 810 may output the result information to a storage device (e.g., the non-volatile storage device 830) (i.e., the result information may be stored in a storage device). The user can identify the determination result by referring to the result information in the storage device. Then, the process in FIG. 4A and FIG. 4B ends.

Figure 8A:
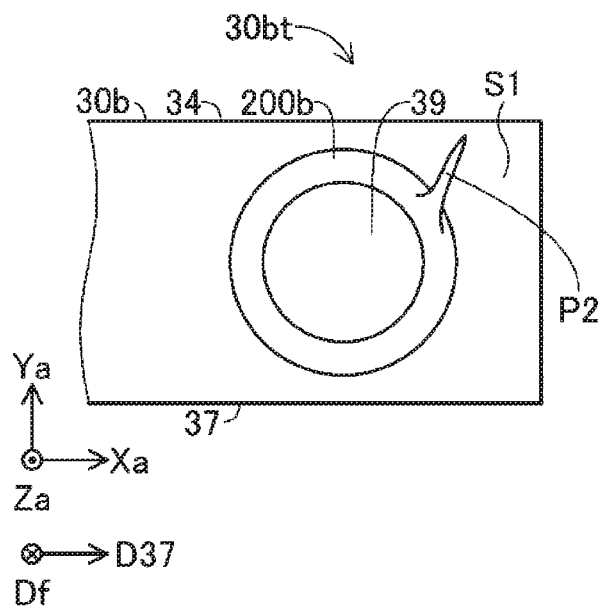
FIG. 8A to FIG. 8C are explanatory diagrams of a second type of unintentional portion.
Figure 8B:
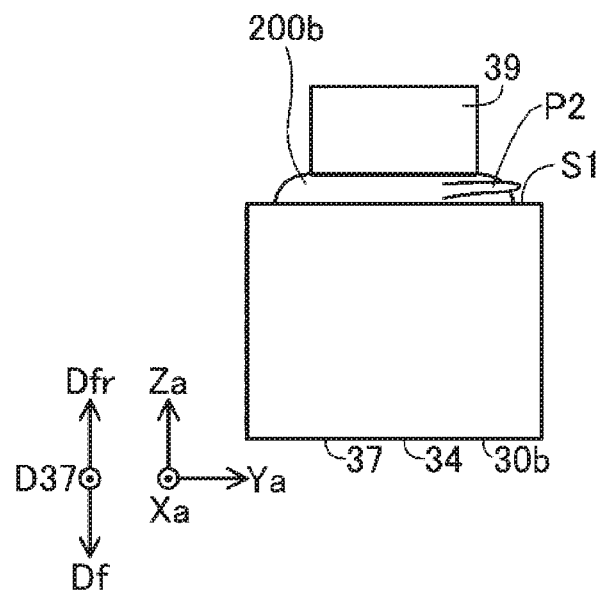
Figure 8C:
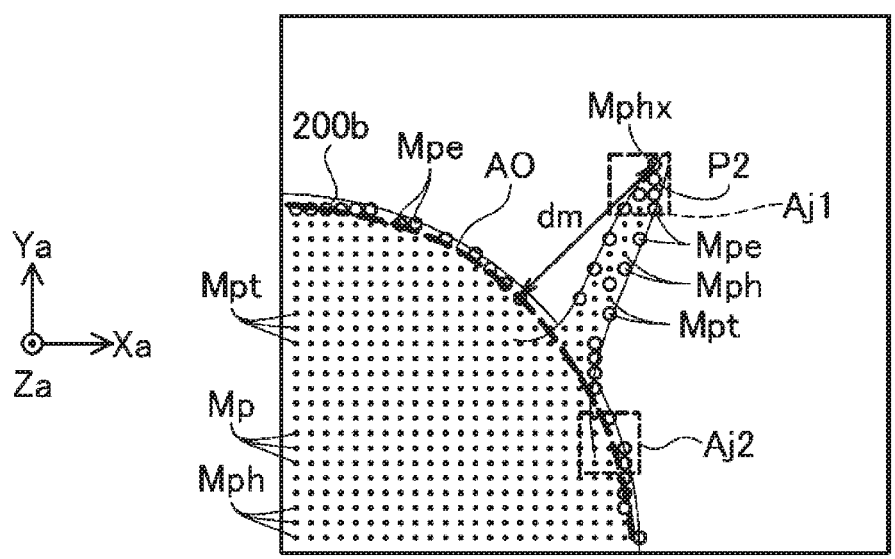

If no target position Mpt satisfying the conditions 1A and 1B is found (S250: No), then in S260, the processor 810 analyzes the first type of three-dimensional data to search for a second type of unintentional portion. FIG. 8A to FIG. 8C are explanatory diagrams of the second type of unintentional portion. FIG. 8A illustrates a ground electrode 30b, as viewed when one is facing the front direction Df (i.e., in the −Za direction), and FIG. 8B illustrates the ground electrode 30b, as viewed when one is facing a direction opposite to the extension direction D37 (i.e., in the −Xa direction). In the figures, the directions Xa, Ya, and Za indicate the positive directions of the coordinate axes Xa, Ya, and Za, respectively, independently of the position of the origin Oa. In the following, description will be given with reference to the ground electrode 30b in FIG. 8A to FIG. 8C.

In the ground electrode 30b illustrated in the figures, a joining portion 200b includes a projecting portion P2 like a thorn. Such a locally projecting unintended projection portion P2 may be formed due to a variety of factors. For example, when spatter occurs, the projection portion P2 is also formed. Like the first type of unintentional portion P1 in FIG. 7A and FIG. 7B, the projection portion P2 may cause deficiency during the transport of spark plugs. Additionally, a discharge may originate at the narrow pointed projection portion P2 instead of at the spark discharge surface S2.

Any of various methods can be adopted as a method for detecting such a projection portion (i.e., the second type of unintentional portion). For example, the processor 810 detects a second type of unintentional portion by using the contour of an area in a target portion 30bt where a plurality of target positions Mpt on the second tip 39 side rather than on the specific surface S1 are distributed.

FIG. 8C is an explanatory diagram of the plurality of target positions Mpt in the joining portion 200b. In the figure, an example arrangement of the plurality of target positions Mpt on a two-dimensional plane represented by the first axis Xa and the second axis Ya. In the figure, a portion including the projecting portion P2 is illustrated. Target positions Mpt represented by white circles are target positions Mpt forming the contour of an area where the plurality of target positions Mpt are distributed and represent the contour of the joining portion 200b (also referred to as contour positions Mpe). An approximation curve AO indicated by a bold line is a curve approximating the arrangement of the plurality of contour positions Mpe (also referred to as an approximation contour line AO). Since the contour of an appropriate joining portion draws a gentle curve, the approximation contour line AO approximating the contour of a joining portion is configured such that the radius of curvature is not too small. For example, the approximation contour line AO is expressed as a circle, an ellipse, a low-degree polynomial, or the like. The approximation contour line AO is calculated by, instead of tracing a path of contour positions Mpe in a narrow projection portion such as the projecting portion P2, smoothly tracing a path of a plurality of contour positions Mpe in a portion other than the projecting portion P2 among the plurality of contour positions Mpe in the joining portion 200b. In this embodiment, a loop-shaped line that traces the contour of a joining portion across the entire perimeter is calculated as the approximation contour line AO. Note that an approximation contour line representing the contour of only a portion including a projection portion of a connection portion, such as the projecting portion P2, may be calculated.

In the figure, a target position Mphx is a measuring position Mp in the projecting portion P2. A distance dm is the shortest distance between the target position Mphx and the approximation contour line AO. The distance dm is large since the projecting portion P2 projects outward from the approximation contour line AO. In this manner, if target positions Mpt in the joining portion 200b at positions located outside the approximation contour line AO and away from the approximation contour line AO are detected, it is estimated that the detected target positions Mpt represent a narrow projection portion (e.g., the projecting portion P2 in FIG. 8C). If such target positions Mpt away from the approximation contour line AO are detected outside the approximation contour line AO, the processor 810 determines that the joining portion includes the second type of unintentional portion.

Specifically, the processor 810 extracts, from among the plurality of target positions Mpt, target positions Mpt whose coordinates in the third axis Za are coordinates on the second tip 39 side rather than on the specific surface S1 (specifically, the approximation plane of the specific surface S1). The extracted target positions Mpt do not include target positions Mpt in the specific surface S1 but include target positions Mpt on the outer surface of a portion higher than the specific surface S1 (i.e., the joining portion and the second tip) (also referred to as high target positions Mph). The processor 810 identifies, from among the extracted plurality of high target positions Mph, contour positions Mpe forming the contour of an area where the two-dimensional coordinates of the plurality of high target positions Mph in the first axis Xa and the second axis Ya (i.e., the coordinates in the directions parallel to the specific surface S1) are distributed.

Any of various methods can be adopted as a method for identifying contour positions Mpe. For example, the total number of measuring positions Mp different from high target positions Mph among eight measuring positions Mp surrounding a high target position Mph of interest is counted (referred to as the total external number). The measuring positions Mp different from high target positions Mph are, for example, measuring positions Mp on the specific surface S1 or measuring positions Mp outside the target portion 30bt. The fact that the total external number is large indicates that the high target position Mph of interest is in contact with an area outside the area where the plurality of high target positions Mph are distributed. Thus, if the total external number is greater than or equal to a predetermined threshold N, the high target position Mph of interest can be determined to be one of the contour positions Mpe. The threshold N is an integer greater than or equal to 1 and less than or equal to 7. In the example in FIG. 8C, the threshold N is 3.

The processor 810 calculates the approximation contour line AO that approximates the identified plurality of contour positions Mpe. The approximation contour line AO is configured to trace a gently curved contour of an appropriate joining portion without tracing a path of contour positions Mpe in a locally projecting portion such as the projecting portion P2. For example, the plurality of contour positions Mpe are approximated by a circle, an ellipse, a low-degree polynomial, or the like.

The processor 810 calculates, for each of the high target positions Mph outside the calculated approximation contour line AO, the shortest distance between the high target position Mph and the approximation contour line AO. Then, the processor 810 searches for any high target position Mph at which the calculated shortest distance is greater than or equal to a predetermined distance threshold Dt. That is, the processor 810 searches for any target position Mpt satisfying the following conditions 2A, 2B, and 2C.

<Condition 2A> The coordinate in the third axis Za is a coordinate on the second tip 39 side rather than on the specific surface S1 (specifically, the approximation plane of the specific surface S1).

<Condition 2B> The two-dimensional coordinates in the first axis Xa and the second axis Ya are coordinates outside the approximation contour line AO.

<Condition 2C> The shortest distance is greater than or equal to the distance threshold Dt.

Here, the distance threshold Dt is set to a value sufficiently larger than values that the shortest distance at high target positions Mph detected outside the approximation contour line AO can take when the joining portion has an appropriate shape. A target position Mpt satisfying the conditions 2A, 2B, and 2C represents a measuring position Mp in a locally projecting portion (i.e., the second type of unintentional portion) such as the projecting portion P2 in FIG. 8A to FIG. 8C.

In S270 in FIG. 4B, the processor 810 determines whether any target position Mpt satisfying the conditions 2A to 2C is found. The fact that there is found any target position Mpt satisfying the conditions 2A to 2C indicates that a target portion of a ground electrode, such as the target portion 30bt of the ground electrode 30b in FIG. 8A and FIG. 8B, includes the second type of unintentional portion. If any target position Mpt satisfying the conditions 2A to 2C is found, that is, if the target portion is determined to include the second type of unintentional portion (S270: Yes), the ground electrode is rejected and excluded from the objects to be manufactured (S298). Then, the process in FIG. 4A and FIG. 4B ends.

Figure 9A:
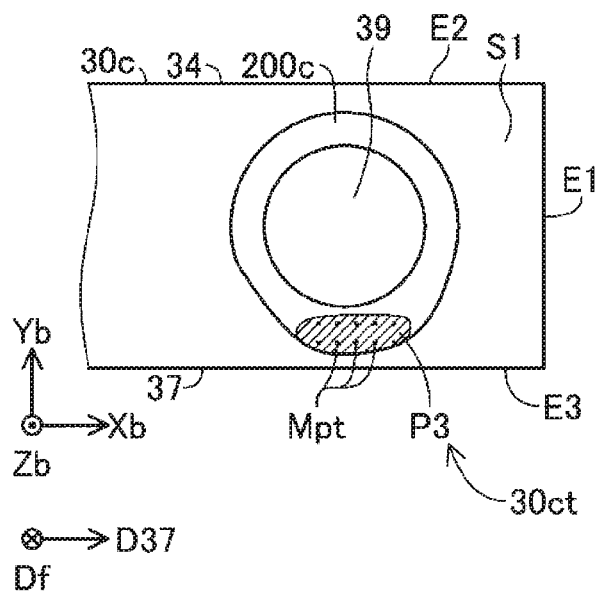
FIG. 9A and FIG. 9B are explanatory diagrams of a third type of unintentional portion.
Figure 9B:
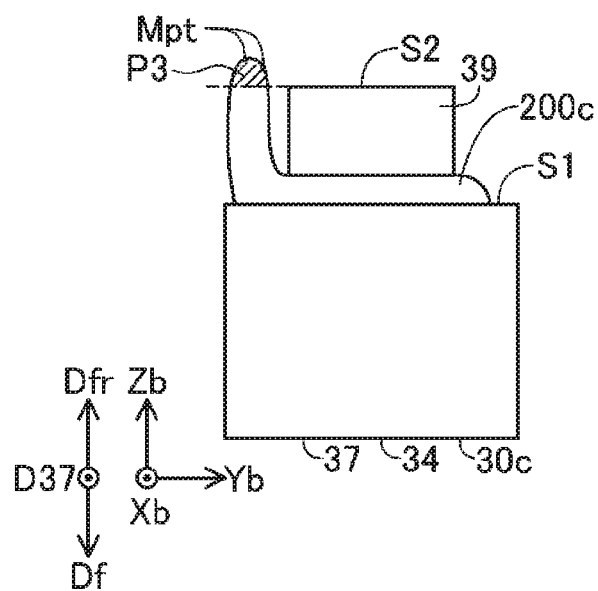

If no target position Mpt satisfying the conditions 2A to 2C is found (S270: No), then in S280, the processor 810 analyzes the second type of three-dimensional data to search for a third type of unintentional portion. FIG. 9A and FIG. 9B are explanatory diagrams of the third type of unintentional portion. FIG. 9A illustrates a ground electrode 30c, as viewed when one is facing the front direction Df (i.e., in the −Zb direction), and FIG. 9B illustrates the ground electrode 30c, as viewed when one is facing a direction opposite to the extension direction D37 (i.e., in the −Xb direction). In the figures, the directions Xb, Yb, and Zb indicate the positive directions of the coordinate axes Xb, Yb, and Zb, respectively, independently of the position of the origin Ob. In the following, description will be given with reference to the ground electrode 30c in FIG. 9A and FIG. 9B.

In the ground electrode 30c illustrated in the figures, a joining portion 200c includes a portion P3 extending to the rear direction Dfr side beyond the spark discharge surface S2. Such an unintended joining portion extending to the rear direction Dfr side beyond the spark discharge surface S2 may be formed due to a variety of factors. A discharge may originate at an unintended projecting portion of the joining portion 200c instead of at the spark discharge surface S2. Such a joining portion includes a third type of unintentional portion, which is a portion on one of the two sides of the spark discharge surface S2 opposite to the second tip 39 side. In the example in FIG. 9A and FIG. 9B, the portion P3, which is indicated by hatching, is the third type of unintentional portion.

The processor 810 analyzes the second type of three-dimensional data is analyzed to identify a plurality of target positions Mpt representing a target portion 30ct of the ground electrode 30c. Then, the processor 810 searches the plurality of target positions Mpt for any target position Mpt satisfying the following condition 3A.

<Condition 3A> The coordinate in the third axis Zb is a coordinate on the side of the spark discharge surface S2 (specifically, the approximation plane of the spark discharge surface S2) opposite to the second tip 39 side.

A target position Mpt satisfying the condition 3A represents a target position Mpt in the third type of unintentional portion such as the portion P3 in FIG. 9A and FIG. 9B.

In S290 in FIG. 4B, the processor 810 determines whether any target position Mpt satisfying the condition 3A is found. The fact that there is found any target position Mpt satisfying the condition 3A indicates that a target portion of a ground electrode, such as the target portion 30ct of the ground electrode 30c in FIG. 9A and FIG. 9B, includes the third type of unintentional portion. If any target position Mpt satisfying the condition 3A is found, that is, if the target portion is determined to include the third type of unintentional portion (S290: Yes), the ground electrode is rejected and excluded from the objects to be manufactured (S298). Then, the process in FIG. 4A and FIG. 4B ends.

If the target portion of the ground electrode is determined to include none of the first type of unintentional portion, the second type of unintentional portion, and the third type of unintentional portion (S250: No, S270: No, S290: No), the ground electrode is used as an object to be manufactured (S294). In S294, as in S298, the processor 810 outputs result information indicating a determination result to a device that accepts the result information. Then, the process in FIG. 4A and FIG. 4B ends. In the process in FIG. 2, the spark plug 100 is manufactured by using a ground electrode used as an object to be manufactured.

As described above, in S220 in FIG. 4A, the processor 810 (FIG. 5) identifies the respective relative positions of a plurality of measuring positions Mp on the outer surface of the target portion 30t of the ground electrode 30 including the body portion 37 and the second tip 39 joined to the specific surface S1 of the body portion 37, the target portion 30t including a portion of the specific surface S1 of the body portion 37 and the second tip 39. In S230, the processor 810 generates three-dimensional coordinate data indicating the three-dimensional shape of a target portion. In each of S240 to S250, S260 to S270, and S280 to S290, the processor 810 analyzes coordinate data to determine whether the target portion includes an unintentional portion. In S298, a ground electrode including the unintentional portion is excluded from the objects to be manufactured. In S294, the ground electrode 30 determined to include no unintentional portion is used as a member to be manufactured, and the spark plug 100 is assembled (FIG. 2). In this way, three-dimensional coordinate data is used to determine whether a target portion of a ground electrode includes an unintentional portion. This can reduce the influence of stains or the like of a ground electrode and enables appropriate determination of whether there is joining deficiency between a body portion of a ground electrode and the tip 39.

In addition, as described with reference to S230 in FIG. 4A and FIG. 6A and FIG. 6B, generating three-dimensional coordinate data includes generating a first type of three-dimensional coordinate data representing coordinates in the first coordinate system CS1 (i.e., relative coordinates based on the specific surface S1 of the body portion 37) and a second type of three-dimensional coordinate data representing coordinates in the second coordinate system CS2 (i.e., relative coordinates based on the spark discharge surface S2 of the second tip 39). As described with reference to S240 in FIG. 4A and S260 in FIG. 4B, when the first type of three-dimensional coordinate data is used, analysis based on the specific surface S1 is facilitated. For example, determination of whether a target position Mpt is located on the tip 39 side rather than on the specific surface S1 can be performed by using only the coordinate in the third axis Za. In addition, determination of whether a target position Mpt is located outside the edges E1, E2, and E3 can be performed by using only the two coordinates in the first axis Xa and the second axis Ya. Furthermore, as described with reference to S280 in FIG. 4B, when the second type of three-dimensional coordinate data is used, analysis based on the spark discharge surface S2 is facilitated. For example, determination of whether a target position Mpt is located on the side of the spark discharge surface S2 opposite to the tip 39 side can be performed by using only the coordinate in the third axis Zb. In this way, analysis is facilitated using the first type of three-dimensional coordinate data and the second type of three-dimensional coordinate data Additionally, as described with reference to S240 in FIG. 4A and S250 in FIG. 4B, and FIG. 7A and FIG. 7B, on the basis of the result of analysis of coordinate data, if the target portion 30*at* of the ground electrode 30*a* includes the first type of unintentional portion P1, which is a portion located on one of the two sides of the specific surface S1 opposite to the body portion 37 side (i.e., on the tip 39 side), when the target portion 30*at* is viewed in a direction parallel to the specific surface S1 of the body portion 37 (the coordinate in the first axis Xa or the coordinate in the second axis Ya), and located outside the edges E1, E2, and E3 of the specific surface S1, when the target portion 30*at* is viewed in a direction vertical to the specific surface S1 (the coordinate in the third axis Za), the target portion 30*at* of the ground electrode 30*a* is determined to include an unintentional portion. Thus, if the joining portion 200*a* protrudes outside the edge E1, E2, or E3 of the body portion 37, it can be appropriately determined that the target portion 30*at* of the ground electrode 30*a* includes an unintentional portion.

Additionally, as described with reference to S260 and S270 in FIG. 4B and FIG. 8A to FIG. 8C, on the basis of the result of analysis of coordinate data, the target portion 30*bt* of the ground electrode 30*b* includes an opposite portion (specifically, a portion including the joining portion 200*b* and the tip 39), which is a portion located on one of the two sides of the specific surface S1 opposite to the body portion 37 side (i.e., on the tip 39 side), when the target portion 30*bt* is viewed in a direction parallel to the specific surface S1 of the body portion 37 (the coordinate in the first axis Xa or the coordinate in the second axis Ya). As described with reference to FIG. 8C, the opposite portion is indicated by a plurality of high target positions Mph. Then, if a high target position Mph at which the shortest distance to the approximation contour line AO is greater than or equal to the distance threshold Dt is detected outside the approximation contour line AO, that is, if the opposite portion includes the second type of unintentional portion P2, which is a portion locally projecting in the direction parallel to the specific surface S1, the target portion 30*bt* of the ground electrode 30*b* is determined to include the unintentional portion P2. Thus, if the joining portion 200*b* includes the locally projecting portion P2, it can be appropriately determined that the target portion 30*bt* of the ground electrode 30*b* includes an unintentional portion.

Additionally, as described with reference to S280 and" S290 in FIG. 4B and FIG. 9A and FIG. 9B, on the basis of the result of analysis of coordinate data, if the target portion 30*ct* of the ground electrode 30*c* includes the third type of unintentional portion P3, which is a portion located on one of the two sides of the spark discharge surface S2 opposite to the tip 39 side, when the target portion 30*ct* is viewed in a direction parallel to the spark discharge surface S2 of the tip 39 (the coordinate in the first axis Xb or the coordinate in the second axis Yb), the target portion 30*ct* of the ground electrode 30*c* is determined to include the unintentional portion P3. Thus, if the joining portion 200*c* projects to the rear direction Dfr side beyond the spark discharge surface S2, it can be appropriately determined that the target portion 30*ct* of the ground electrode 30*c* includes an unintentional portion.

B. Modifications (1) Any of various portions including at least a portion of the specific surface S1 of the body portion 37 and the tip 39 can be used as a target portion of the ground electrode 30 (FIG. 5) that is indicated by three-dimensional coordinate data. For example, one or more edges selected as desired from among the three edges E1, E2, and E3 in the vicinity of a portion of the specific surface S1 to which the tip 39 is joined may be omitted from the target portion. Note that, as in the first type of unintentional portion P1 in FIG. 8A to FIG. 8C, to search for a first type of unintentional portion arranged outside an edge of the specific surface S1, the target portion preferably includes at least a portion of the edge of the specific surface S1.

(2) Instead of the method in the embodiment described above, any of various other methods may be used as a method for determining whether the joining portion 200 of the body portion 37 of the ground electrode 30 and the tip 39 includes a predetermined unintentional portion that is an unintended portion. For example, in the processing of S240 in FIG. 4A and S260 in FIG. 4B, the approximation plane representing the specific surface S1 may be calculated by, instead of using all of the plurality of target positions Mpt in the specific surface group, using at least one target position Mpt among the plurality of target positions Mpt in the specific surface group. For example, a plane including the target position Mpt having the shortest distance among the plurality of target positions Mpt in the specific surface group (i.e., the target position Mpt closest to the distance measurement device 710) and vertical to the irradiation direction LD can be used as a plane approximating the specific surface S1. The approximation plane representing the spark discharge surface S2, which is used in the processing of S280 in FIG. 4B, may also be calculated by using various methods.

Additionally, in the processing of S240 in FIG. 4A, the lines indicating the edges E1, E2, and E3 of the specific surface S1 may be identified by using any other method instead of a method for approximating the coordinate points of a plurality of target positions Mpt forming the ends among the plurality of target positions Mpt in the specific surface group. For example, the processor 810 may analyze a captured image obtained by capturing an image of the specific surface S1 by using a digital camera to identify the edges of the specific surface S1 and combine the result of analysis of the captured image with the first type of three-dimensional coordinate data to determine the edges in the first coordinate system CS1 representing the first type of three-dimensional coordinate data.

(3) In the processing of S260 in FIG. 4B, instead of the method described with reference to FIG. 8C, any of various other methods can be adopted as a method for detecting a locally projecting second type of unintentional portion P2. For example, a second type of unintentional portion may be detected by using the density of contour positions Mpe. FIG. 8C illustrates two areas Aj1 and Aj2 having the same shape and size as a predetermined shape and size (in the example in FIG. 8C, the areas Aj1 and Aj2 are square areas). The first area Aj1 is arranged at a position overlying the projecting portion P2, and the second area Aj2 is arranged at a position overlying a portion of the contour of the joining portion 200*b* that is different from the projecting portion P2. The areas Aj1 and Aj2 are areas larger than the width of a long, narrow projection portion to be detected and sufficiently smaller than the joining portion 200*b*.

The first area Aj1 overlaps the front end portion of the projecting portion P2. Since a projection portion typically has a narrow front end portion, the periphery of the front end portion is surrounded by measuring positions Mp different from high target positions Mph. Thus, a plurality of high target positions Mph constituting the front end portion are likely to be identified as contour positions Mpe. As a result, the total number of contour positions Mpe within the area Aj1 is large.

In contrast, the second area Aj2 overlaps a portion of the contour of the joining portion 200b that is different from the projecting portion P2. Since a portion of the contour that is different from a projection portion is represented by a gentle curve, only high target positions Mph overlying a single line within the second area Aj2 may be identified as contour positions Mpe. As a result, the total number of contour positions Mpe within the area Aj2 is small.

As described above, the total number of contour positions Mpe within the first area Aj1 is greater than the total number of contour positions Mpe within the second area Aj2. That is, in the locally projecting portion P2 of the joining portion 200b, the density of the contour positions Mpe is greater than that in other portions of the joining portion 200b. Thus, a portion having a density of contour positions Mpe greater than or equal to a predetermined threshold density may be detected as a second type of unintentional portion. In this method, a second type of unintentional portion can be detected without using the approximation contour line AO. Note that the density of contour positions Mpe is a density calculated by using an area having a predetermined shape and size and is a local density. The threshold density is set to a sufficiently larger value than the density of contour positions Mpe that can be detected when the joining portion has an appropriate shape.

In general, various methods can be adopted as follows. That is, a plurality of high target positions Mph whose locations in the direction vertical to the specific surface S1 are on the tip 39 side rather than on the specific surface S1 (i.e., on the side opposite to the body portion 37 serving as a base portion) are identified. Contour positions Mpe representing the contour of an area where the locations of the identified plurality of high target positions Mph in the direction parallel to the specific surface S1 are distributed are identified. The identified contour positions Mpe are analyzed to determine whether the area where the high target positions Mph are distributed includes a portion locally projecting in the direction parallel to the specific surface S1. If the area where the high target positions Mph are distributed includes a projecting portion, it can be determined that the target portion of the electrode includes a second type of unintentional portion.

(4) Instead of the three types of unintentional portions described with reference to FIG. 7A to FIG. 9B, any of various unintentional portions may be used as an unintentional portion that is are determined to be included or not in a target portion of an electrode. For example, the determination of one or two types of unintentional portions selected as appropriate in advance from among the three types of unintentional portions described above may be omitted. That is, one or two of "S240 to S250", "S260 to S270", and "S280 to S290" in FIG. 4A and FIG. 4B may be omitted. Alternatively, the determination of whether another type of unintentional portion different from the three types of unintentional portions described above is included in a target portion of an electrode may be performed. Note that the three types of unintentional portions in FIG. 7A to FIG. 9B may cause deficiency. Thus, it is preferably determined whether at least one type of unintentional portion among the three types of unintentional portions is included in a target portion of an electrode.

(5) As three-dimensional coordinate data, only one of the first type of three-dimensional coordinate data represented in the first coordinate system CS1 based on the specific surface S1 illustrated in FIG. 6A and the second type of three-dimensional coordinate data represented in the second coordinate system CS2 based on the spark discharge surface S2 illustrated in FIG. 6B may be generated. Alternatively, three-dimensional coordinate data represented in a coordinate system different from both the first coordinate system CS1 and the second coordinate system CS2 (e.g., a predetermined coordinate system) may be generated. In any case, the processor 810 can determine whether an unintentional portion is included in a target portion of an electrode, by analyzing three-dimensional coordinate data by using a method similar to the determination method described above.

Note that any of various coordinate systems having one coordinate axis vertical to the specific surface S1 can be adopted as a coordinate system that represents relative coordinates based on the specific surface S1. For example, one coordinate axis among three orthogonal coordinate axes may be vertical to the specific surface S1 and the two coordinate axes may be parallel to the specific surface S1. Here, the origin may be arranged at a position away from the specific surface S1. Alternatively, a position in the direction parallel to the specific surface S1 may be represented in a polar coordinate system. Likewise, any of various coordinate systems having one coordinate axis vertical to the spark discharge surface S2 can be adopted as a coordinate system that represents relative coordinates based on the spark discharge surface S2. For example, one coordinate axis among three orthogonal coordinate axes may be vertical to the spark discharge surface S2 and the two coordinate axes may be parallel to the spark discharge surface S2. Here, the origin may be arranged at a position away from the spark discharge surface S2. Alternatively, a position in the direction parallel to the spark discharge surface S2 may be represented in a polar coordinate system.

Note that when the orientation of the ground electrode 30 relative to the distance measurement device 710 (FIG. 5) is adjusted such that the specific surface S1 is approximately vertical to the irradiation direction LD (and therefore the direction of a distance measured by the distance measurement device 710), a distance measured by the distance measurement device 710 may be used directly as the coordinate in the direction vertical to the specific surface S1. The same applies to the coordinate in the direction vertical to the spark discharge surface S2.

(6) A measurement device used to identify the respective relative positions of a plurality of points on the outer surface of a target portion of an electrode may be any device capable of measuring a three-dimensional positional relationship among a plurality of points in the target portion instead of the distance measurement device 710 described with reference to FIG. 5. For example, a device including a touch probe that comes into contact with each of a plurality of points in a target portion of an electrode to measure a three-dimensional positional relationship among the plurality of points may be used. Note that a non-contact three-dimensional coordinate measurement device is preferably used for high-accuracy measurement of a three-dimensional positional relationship.

(7) Instead of resistance welding, any of various other methods may be used as a method for joining the body portion 37 and the tip 39 to each other. For example, the second tip 39 may be joined to the body portion 37 by laser beam welding. In any case, it is preferable to prepare the ground electrode 30 by using the result of determination of whether a joining portion where the body portion 37 and the tip 39 are joined to each other includes an unintentional portion.

(8) The electrode prepared by using the result of determination of whether an unintentional portion is included may be the center electrode 20 instead of the ground electrode 30. In this case, it is preferable to prepare the center electrode 20 by using the result of determination of whether a joining portion of the rod portion 28 and the first tip 29 includes an unintentional portion.

(9) Instead of the configuration of each embodiment described above, any of various other configurations can be adopted as a configuration of a spark plug. For example, the front-end-side packing 8 (FIG. 1) may be omitted. In this case, the reduced inner diameter portion 56 of the metal shell directly supports the reduced outer diameter portion 16 of the insulator. Alternatively, instead of a front end surface of a front end portion of a center electrode (e.g., a surface on the front direction Df side of the first tip 29 in FIG. 1), side surfaces of the front end portion of the center electrode (surfaces oriented in a direction vertical to the axial line CL) and a ground electrode may form a discharge gap. The total number of discharge gaps may be two or more. The resistor 73 may be omitted. A magnetic body may be arranged between a center electrode in a through hole of an insulator and a metal terminal.

(10) The control device 800 in FIG. 5 may be a device of a type different from that of a personal computer. For example, the control device 800 may be incorporated in the distance measurement device 710. Alternatively, a plurality of devices (e.g., computers) capable of communicating with each other via a network may have each some of the data processing functions of a control device and may provide the functions of the control device in their entirety (a system including these devices corresponds to the control device).

In each embodiment described above, part of the configuration implemented by hardware may be implemented by software instead, or, reversely, all or part of the configuration implemented by software may be implemented by hardware instead. For example, the function of S230 in FIG. 4A may be implemented by a dedicated hardware circuit.

Further, when some or all of the functions in the present invention are implemented by a computer program, the program can be provided in such a manner as to be stored in a computer-readable recording medium (e.g., a non-transitory recording medium). The program may be used in a state such that the program is stored in a recording medium (computer-readable recording medium) identical to or different from that when provided. Examples of the "computer-readable recording medium" may include not only portable recording media such as a memory card and a CD-ROM but also internal storage devices within a computer, such as various ROMs, and external storage devices connected to the computer, such as a hard disk drive.

While the present invention has been described with reference to an embodiment and modifications, the embodiment of the invention described above is intended to easily understand the present invention, but is not intended to limit the present invention. The present invention can be modified or improved without departing from the gist thereof and the scope defined by the claims, and equivalents of such modifications or improvements are also included in the present invention.

What is claimed is:

1. A method of manufacturing a spark plug having an electrode, the electrode including a base portion and a tip joined to a specific surface that is a specific outer surface of the base portion, the tip forming a spark discharge surface, the method comprising:
   generating three-dimensional coordinate data representing a three-dimensional shape of a target portion of the electrode including the base portion and the tip joined to the base portion, by identifying respective relative positions of a plurality of points on an outer surface of the target portion, the target portion being a portion including at least a portion of the specific surface of the base portion and the tip;
   determining whether the target portion of the electrode includes a predetermined unintentional portion that is an unintended portion by analyzing the coordinate data;
   excluding the electrode, which includes the unintentional portion, from objects to be manufactured; and
   assembling the spark plug by using the electrode, which does not include the unintentional portion.

2. The method according to claim 1, wherein
   the step of generating the three-dimensional coordinate data includes a step of generating at least one of a first type of three-dimensional coordinate data representing relative coordinates based on the specific surface of the base portion and a second type of three-dimensional coordinate data representing relative coordinates based on the spark discharge surface of the tip.

3. The method according to claim 1, wherein
   in the step of determining whether the target portion includes the unintentional portion,
   on the basis of a result of analysis of the coordinate data,
      if the target portion of the electrode includes a first type of unintentional portion that is a portion located on one of two sides of the specific surface opposite to the base portion side when the target portion is viewed in a direction parallel to the specific surface of the base portion and located outside an edge of the specific surface when the target portion is viewed in a direction vertical to the specific surface, the target portion of the electrode is determined to include the unintentional portion.

4. The method according to claim 1, wherein
   in the step of determining whether the target portion includes the unintentional portion,
   on the basis of a result of analysis of the coordinate data,
      if the target portion of the electrode includes an opposite portion that is a portion located on one of two sides of the specific surface opposite to the base portion side when the target portion is viewed in a direction parallel to the specific surface of the base portion, and
      if the opposite portion includes a second type of unintentional portion that is a portion locally projecting in the direction parallel to the specific surface, the target portion of the electrode is determined to include the unintentional portion.

5. The method according to claim 1, wherein
   in the step of determining whether the target portion includes the unintentional portion,
   on the basis of a result of analysis of the coordinate data, if the target portion of the electrode includes a third type of unintentional portion that is a portion located on one of two sides of the spark discharge surface opposite to the tip side when the target portion is viewed in a direction parallel to the spark discharge surface of the tip, the target portion of the electrode is determined to include the unintentional portion.

* * * * *